(12) United States Patent  (10) Patent No.: US 7,299,130 B2
Mulligan et al.  (45) Date of Patent: Nov. 20, 2007

(54) UNMANNED VEHICLE

(75) Inventors: Anthony C. Mulligan, Tucson, AZ (US); Christopher D. Troudt, Tucson, AZ (US); Jason Michael K. Douglas, Tucson, AZ (US)

(73) Assignee: Advanced Ceramic Research, Inc., Tucson, AZ (US)

( * ) Notice: Subject to any disclaimer, the term of this patent is extended or adjusted under 35 U.S.C. 154(b) by 161 days.

(21) Appl. No.: 11/011,001

(22) Filed: Dec. 13, 2004

(65) Prior Publication Data
US 2006/0074557 A1   Apr. 6, 2006

Related U.S. Application Data

(63) Continuation-in-part of application No. 11/009,681, filed on Dec. 10, 2004, now abandoned.
(60) Provisional application No. 60/529,388, filed on Dec. 12, 2003.

(51) Int. Cl.
*G01C 21/26* (2006.01)
(52) U.S. Cl. ........................................ 701/213; 340/961
(58) Field of Classification Search .................. 701/1, 701/3, 7, 213, 120, 121, 300, 302; 340/960, 340/961, 947; 342/29, 30, 32, 454, 455, 342/450
See application file for complete search history.

(56) References Cited

U.S. PATENT DOCUMENTS

| 3,573,818 | A  | * | 4/1971 | Lennon et al. ................ 342/29 |
| 4,674,710 | A  | * | 6/1987 | Rodriguez ................ 244/76 R |
| 4,997,144 | A  | * | 3/1991 | Wolff et al. ................ 244/3.14 |
| 5,728,965 | A  | * | 3/1998 | Fesland et al. ............... 89/1.11 |
| 6,587,757 | B2 | * | 7/2003 | Sainthuile ........................ 701/1 |
| 2003/0016159 | A1 | * | 1/2003 | Stayton et al. ................ 342/30 |
| 2005/0004759 | A1 | * | 1/2005 | Siegel ........................ 701/223 |

* cited by examiner

*Primary Examiner*—Dalena Tran
(74) *Attorney, Agent, or Firm*—Banner & Witcoff, Ltd.

(57) ABSTRACT

Methods and apparatuses provide surveillance of a convoy. At least one unmanned aerial vehicle (UAV) obtains images around the convoy's position to provide information about potential hostile activity while the UAV follows a generally curvilinear path around the convoy as instructed by one of the convoy vehicles. Path planner algorithm software is executed by the controlling convoy vehicle in which position and velocity information regarding the unmanned aerial vehicle and the convoy are processed to determine values of control variables. The determined values are sent to the unmanned aerial vehicle over a wireless communications channel. The path of the surveillance vehicle may be changed in order to provide evasive measures to avoid an attack on the surveillance vehicle by an adversary.

21 Claims, 19 Drawing Sheets

Change of Latitude    Change of Longitude

Technical Performance Indices for Various ACR Heavy Fuels Engines

| Version | 1.0 | 2.0 | 2.1 | 2.2 | 3.0 | 4.1 | |
|---|---|---|---|---|---|---|---|
| Base Engine | OS MAX 46 FX | OS MAX 46 FX | OS MAX 46 FX | Saito FA-91S | OS MAX 50 FX | RCS 110 | DARPA Technical Indices of Performance |
| Head Type | Modified diesel head w/variable comparison ratio | ACR-developed head with variable comparison Ratio and spark ignition | Stock head w/ spark ignition | Stock head w/spark ignition | Stock head w/spark ignition | ACR developed head w/spark ignition & glow plug | n/a |
| Engine Type | 2 cycle | 2 cycle | 2 cycle | 4 cycle | 2 cycle | 2 cycle | n/a |
| Ignition Type | HOCI | Spark | Spark | Spark | Spark | Spark | n/a |
| Starting Aid | MMO | MMO/other | other/butane | other/butane | other/butane | Automotive diesel glow plug | |
| Displacement (in³) | .46 | .46 | .46 | .91 | .51 | 1.40 | n/a |
| Power (hp) | 0.79 (stock carb) 0.61 (smaller carb) | 0.79 (stock carb) | 0.79 (stock card) | 1.37 | 1.02 | 1.59 | 1.3 – 1.5 |
| Weight lbs. | 0.8 | 1.26 | 1.24 | 1.56 | 1.26 | 2.43 | n/a |
| Power to weight ratio (hp lbs) | 097 (stock carb) 0.75 (smaller carb) | 0.65 (stock carb) | 0.65 (stock carb) | 0.9 | 0.81 | 0.65 | >1:1 hp.lb |
| Life (hrs) | 3 hrs @WOT | Not determined | Not determined | 11 hrs @cruise power | 10 1-hour emission cycles | Not determined | 10X 1-hr emission cycles |
| Engine Start (sec.) | 7 sec.(avg.) | 5 sec. (avg.) | 5 sec. (avg.) | 7 sec. (avg.) | 5 sec. (avg.) | 6 sec. | <15 sec. w/<5% non-starters |
| Fuel Consumption @WOT (hrs/p-hr) | 20.0 @ 9,600 rev/min (stock carb) 10.6 @ 9,000 rev/min (smaller carb) | 10.6 @ 9,400 rev/min (stock carb) | Not determined | 15.0 @ 9,500 rev/min | 9.3 @ 15,400 rev/min | 23.2 @ 7,600 rev/min | n/a |
| Fuel Efficiency @WOT (hrs/p-hr) | 1.25 (stock carb) 0.88 (smaller carb) | 0.68 | Not determined | 0.55 | 0.60 | 0.73 | n/a |
| Fuel Efficiency @ cruise (lbm/hp-hr) | Not determined | Not determined | Not determined | 0.52 @ 7,000 rev/min | 0.95 @ 8,200 rev/min | 0.84 @ 5,500 rev/min | <1.0 lbm/hp-hr |
| Exhaust emission during warm | Heavy, black | Moderate, light blue | Moderate, light blue | Invisible | Invisible | Invisible | n/a |

FIG. 21

UNMANNED VEHICLE

This application is a Continuation-In-Part of U.S. application Ser. No. 11/009,681, filed on Dec. 10, 2004, now abandoned which claims priority to provisional U.S. application Ser. No. 60/529,388 ("Unmanned Vehicle"), tiled Dec. 12, 2003.

FIELD OF THE INVENTION

Aspects of the present invention relate to unmanned vehicles. In particular, aspects of the invention provide unmanned vehicles that autonomously track vehicles and/or other unmanned vehicles.

BACKGROUND OF THE INVENTION

In order to protect both material and human assets, it is important to be cognizant of potential hostile activity that may endanger the assets. There are numerous scenarios that may encounter hostile activity, including troop movement and ship maneuvers. Effective surveillance provides information (e.g., images) of potential hostile activity near the protected assets.

Surveillance may be provided by an aircraft or by a satellite that executes a single pass over a large region and is typically restricted in the time of surveillance coverage. Subsequent observations may be limited to the next pass by a satellite or aircraft. The area of interest (e.g., corresponding to troop movement) may be a small subset of the region of surveillance and may consequently require arduous analysis of all of the collected data. Moreover, the corresponding position of the protected assets is typically dynamic, in which movements are often irregular in direction and speed. Thus, effective surveillance requires to be equally dynamic and to be synchronized with the movements of the protected assets.

Thus, there is an important need to protect assets by providing surveillance that tracks the protected assets over the entire time of interest. Moreover, a method and apparatus providing the surveillance should minimize danger to any personnel supporting the surveillance activity.

BRIEF SUMMARY OF THE INVENTION

An aspect of the present invention includes methods and apparatuses for providing surveillance of a convoy, which comprises at least one ground vehicle. An unmanned aerial vehicle (UAV) operates as a satellite vehicle and obtains images around the convoy's position to provide information about potential hostile activity. The unmanned aerial vehicle maintains a generally curvilinear, at least in part, or looping path around the convoy as instructed by one of the convoy vehicles. Path planner algorithm software is executed by the controlling convoy vehicle, in which position and velocity information regarding the unmanned aerial vehicle and the convoy are processed to determine values of control variables. The determined values are sent to the unmanned aerial vehicle over a wireless communications channel.

With another aspect of the invention, a controller determines a new roll angle and a new altitude from position information of a surveillance vehicle and a convoy in order to maintain the surveillance vehicle in a desired path. The controller sends roll angle commands and altitude commands to the surveillance vehicle in order to maintain the desired path.

With another aspect of the invention, a surveillance vehicle, which is following a path with respect to a convoy, and a convoy vehicle send position and velocity information to a control center (central controller), which has a fixed ground position. The central controller sends instructions to the surveillance vehicle so that the surveillance vehicle maintains its path with respect to the convoy.

With another aspect of the invention, the path of the surveillance vehicle is changed in order to provide evasive measures to avoid an attack on the surveillance vehicle by an adversary. Different types of paths may be utilized. For example, the surveillance vehicle may typically follow a circular path around the convoy but may revert to a zig-zag path if the controller determines that there may be a potential attack on the surveillance vehicle.

With another aspect of the invention, a convoy may comprise at least one ground vehicle or at least one ship or other water vehicle. One or more aerial vehicles may serve as a surveillance vehicle for the at least one ground vehicle or the at least one water vehicle. Also, another ship or a submarine may function as the surveillance vehicle for protecting the at least one water vehicle.

BRIEF DESCRIPTION OF THE DRAWINGS

A more complete understanding of the present invention and the advantages thereof may be acquired by referring to the following description in consideration of the accompanying drawings, in which like reference numbers indicate like features and wherein:

FIG. 21 shows technical performance indices for heavy fuels engines according to embodiments of the invention.

DETAILED DESCRIPTION

System Overview

Figure 1:
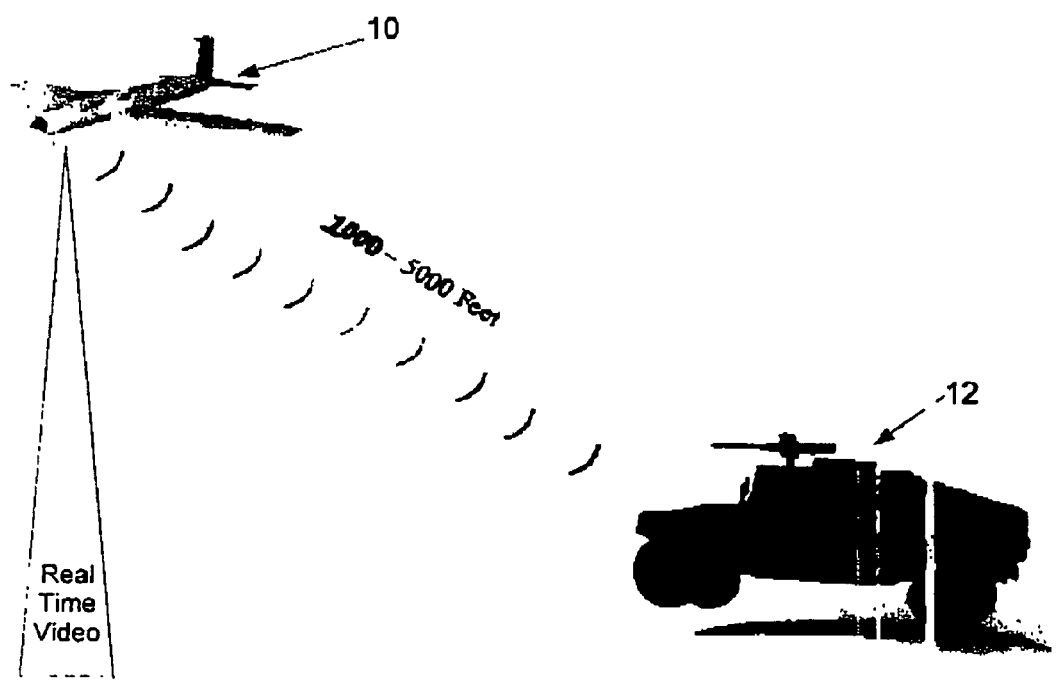
FIG. 1 shows an unmanned aerial vehicle (UAV) controlled by a surface vehicle according to an embodiment of the invention.

FIG. 1 shows an unmanned aerial vehicle (UAV) 10 flying in front of a vehicle 12. Vehicle 12 may monitor the position of UAV 10 and communicate with the flight control system of UAV 10 to cause UAV 10 to constantly remain in front of vehicle 12 and provide overhead surveillance. The embodiment may also cause UAV 10 to maintain a path around vehicle 12 so that images may be obtained in front of, behind, and on the flanks of vehicle 12. In one embodiment, UAV 10 includes a global positioning system (GPS) receiver and transmits current coordinates to vehicle 12. Vehicle 12 may also include a GPS receiver and may use information received from both GPS receivers to calculate the trajectory of UAV 10. This information may then be used to calculate one or more way points to keep UAV 10 on a desired path. As described herein, a convoy may comprise at least one vehicle, e.g., vehicle 12. One or more of the vehicles in the convoy may control UAV 10. Vehicle 12 may transmit those way points to the flight control system of UAV 10. This allows UAV 10 to autonomously follow vehicle 12.

In one implementation, UAV 10 remains at a constant velocity regardless of the velocity of vehicle 12. If UAV 10 is traveling faster than vehicle 12, then UAV 10 would fly in a pre-described pattern such that the total linear distance covered by UAV 10 is equal to the distance covered by vehicle 12. If vehicle 12 stops, then UAV 10 would travel, at least in part, in an orbit pattern, such as a generally circular or elliptical pattern or other closed-loop pattern. In another implementation, the direction that vehicle 12 points based on its last calculated trajectory is used to steer UAV 10 to fly its orbit over a certain location. UAV 10 may also be programmed to change flight speeds to match the speed of vehicle 12 and/or to fly other types of routines such as a spiral formation or a zig-zag formation.

UAV 10 may include a camera for recording images and may transmit those images to vehicle 12. One skilled in the art will appreciate that UAV 10 may include one or more of a variety of sensors and or sensor modules. Exemplary sensors include infrared cameras, radar devices, acoustic sensors, heat sensors and other conventional sensors used by military planes and aerial vehicles. In one particular implementation, UAV 10 is equipped with one or more smoke grenades or markers that may be released to identify potential ambush sites or other sites of interest.

UAV 10 may be constructed of a modular design to facilitate changing modules such as motor modules, sensor modules and computer modules.

UAV 10 may also include a variety of different munitions, such as air-to-air missiles, air-to-ground missiles, bombs and rockets. Communications equipment, radar jammers, etc. may also be included.

Figure 2:
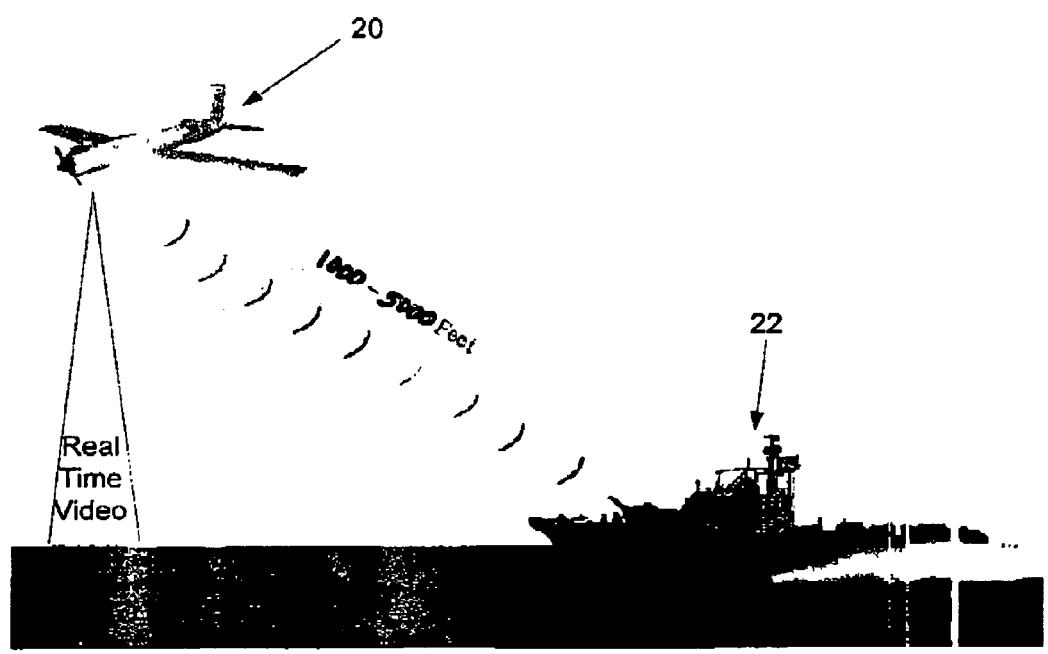
FIG. 2 shows an unmanned aerial vehicle (UAV) controlled by a water vehicle according to an embodiment of the invention.

FIG. 2 shows that a UAV 20 may be used to provide overhead surveillance for a boat 22. UAVs may be used to provide overhead surveillance to nonmilitary boats and vehicles. For example, a UAV may fly 10-20 miles in front of an oil tanker and provide situational awareness to the oil tanker's crew.

Other embodiments include using UAVs to provide support for ATVs, motorcycles, full size supply convoys, Bradley fighting vehicles and other armored vehicles and tanks. The disclosed UAVs may used to support police department and fire department activities. The disclosed UAVs may also be used to support manned helicopters and airplanes.

In one alternative embodiment of the invention, UAVs may use vision based navigation. For example, a UAV may include a thermal camera and be programmed to track an infrared strobe attached to a vehicle or a thermal image. This embodiment allows a UAV to autonomously follow a moving target based on vision. Of course, following may include flying in a predetermined formation as described herein. Moreover, other embodiments may use electromagnetic radiation at wavelengths other than those corresponding to infrared radiation, such as radio waves. Vision based navigation embodiments may be used to allow a UAV to land on a moving vehicle, such as a car or boat by setting the following distance to zero. Similarly, vision based embodiments may be used to guide a UAV to a fuel source, such as a tanker aircraft.

UAVs may also be programmed to recognize specific targets with automatic target recognition software and automatically follow those targets to either track or to provide persistent situational awareness for that moving target. An example of a moving target could be a company commander leading troops through enemy territory wherein without direct communication to and from the commander the vehicle would automatically follow him and his troop and provide situational awareness when appropriate. Targets may be recognized based on how they look to optical sensors, infrared sensors or any other sensors.

In other embodiments of the invention, two or more UAVs (which may form a convoy) may form client and server nodes of a network. In these embodiments, one or more UAVs may be configured to autonomously follow a primary UAV using a loop pattern in two or three dimensions around the primary UAV. That is, the tracking UAV may loop around the primary UAV, as well as loop over and under and/or in front and in back of the primary UAV. Alternatively, the two or more UAVs may be configured to both track a vehicle simultaneously but at spaced distances from one another. For example, with two UAVs, the UAVs may both travel on similar closed-loop paths about the tracked vehicle but may travel at different elevations and/or spaced apart from one another, such as about 180° apart on a generally curvilinear path.

Figure 3A:
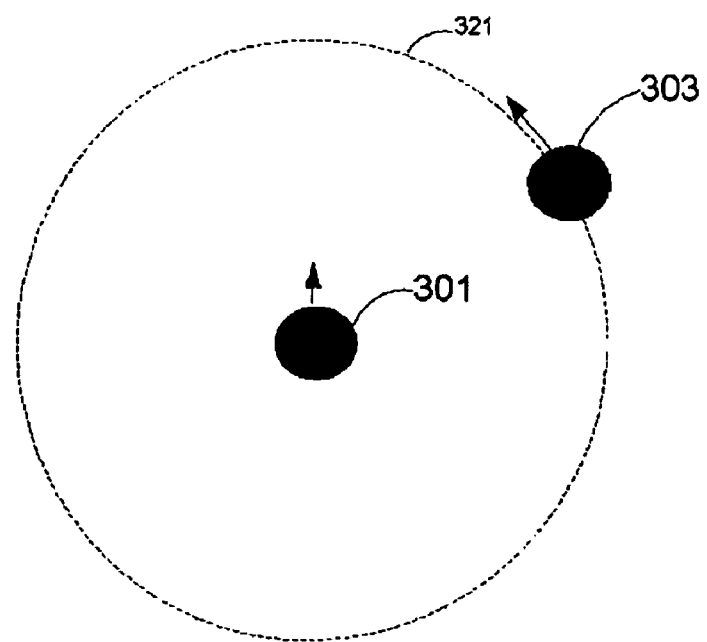
FIG. 3A shows an unmanned aerial vehicle (UAV) tracking a convoy in a circular path according to an embodiment of the invention.

FIG. 3A shows one unmanned aerial vehicle (UAV) 303 tracking convoy 301 in an approximately circular path 321 about convoy 301 according to an embodiment of the invention. Generally, UAV 303 travels about convoy 301 in a loop pattern that is curvilinear at least in part and is completed over time as the convoy 301 travels, such that UAV 303 travels in essentially a complete 360° path around convoy 301. The UAV may travel at one or more elevations relative to the convoy 301. It will be understood that, depending on the tracking configuration, the speed at which convoy 301 travels and the path that convoy 301 proceeds along, the actual configuration of the loop pattern that UAV 303 travels will vary. For example, if convoy 301 travels along a straight path at a constant speed, with a circular tracking configuration, the path of UAV 303 will generally resemble a spiral pattern as the UAV 303 travels back and around the forwardly-moving convoy 301. Over time, UAV 303 will travel essentially 360° at one or more elevations about convoy 301 and return to its original relative starting position with respect to convoy 301 so that it will have completed a curvilinear or closed-loop pattern about convoy 301. Other embodiments of the invention may utilize other curvilinear closed-loop paths. Consequently, UAV 303 obtains images of a 360° area in various elevations around convoy 301.

While UAV 303 may be an aerial vehicle, other embodiments of the invention support surveillance vehicles (manned or unmanned) that travel on the surface of the water, under the surface of the water, on the ground, or in outer space. Also, embodiments of the invention support convoy 301 that travels on the surface of the water, under the surface of the water, on the ground, or in outer space.

Figure 3B:
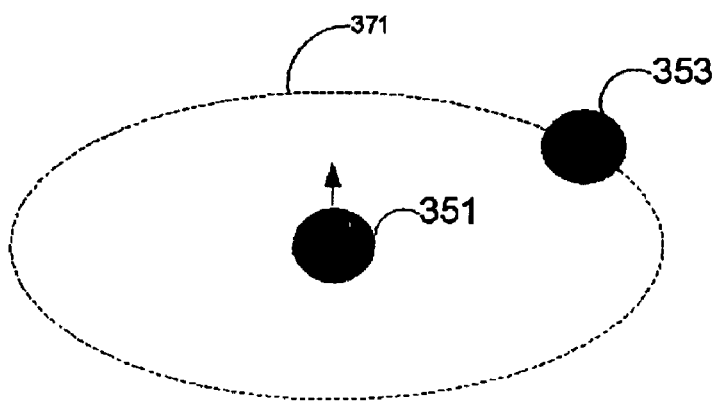
FIG. 3B shows an unmanned aerial vehicle (UAV) tracking a convoy in a non-circular path according to an embodiment of the invention.

FIG. 3B shows UAV 353 tracking convoy 351 in a non-circular path 371 (e.g., an elliptical path) according to an embodiment of the invention. The embodiment also supports path 351 that may be a circular path having different path parameters, e.g., a desired radial distance from convoy 351.

A path planning algorithm may determine to change the path of UAV 353 from circular path 321 to path 371 if a velocity ratio ($V_{UAV}/V_{convoy}$) exceeds a predetermined amount if evasive measures are necessary. If evasive measures are necessary, UAV 353 may follow different types of paths, including a zig-zag path within a determined region or some other path that may appear to be random to an adversary.

Figure 4:
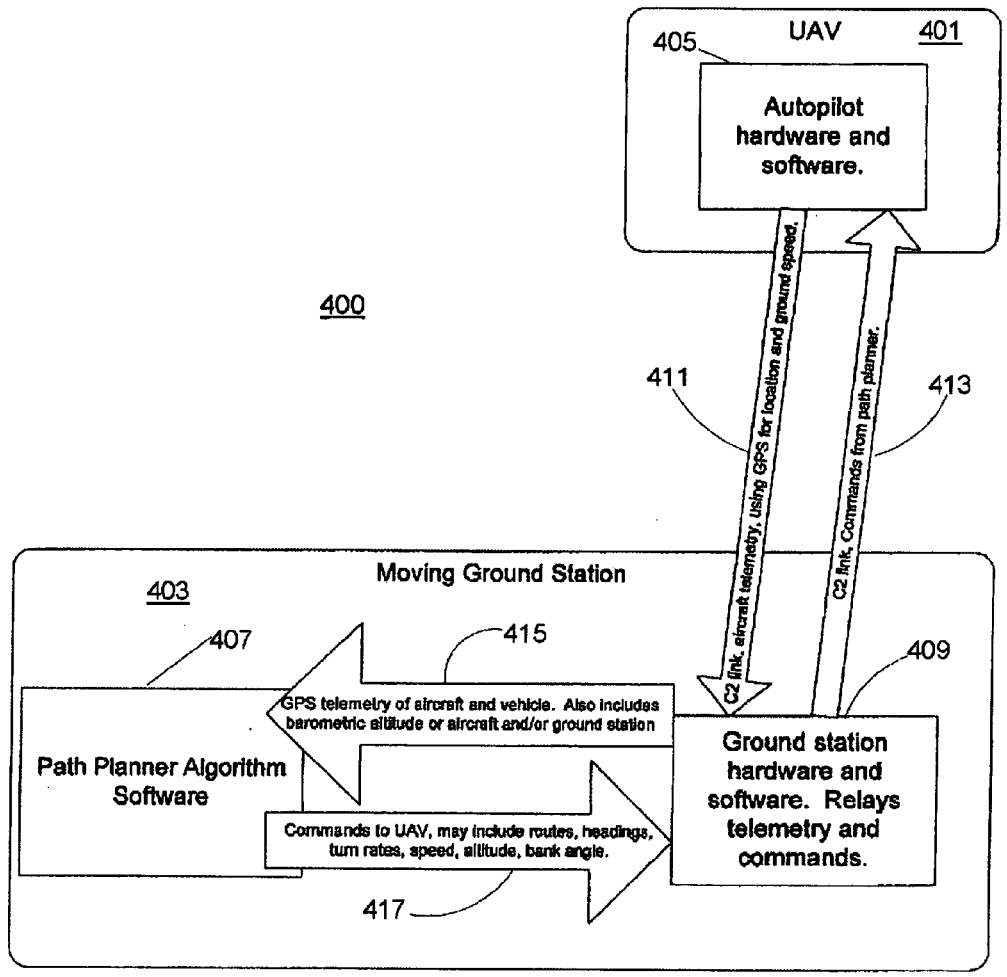
FIG. 4 shows an apparatus for controlling an unmanned aerial vehicle (UAV) with a moving ground station according to an embodiment of the invention.
Figure 11:
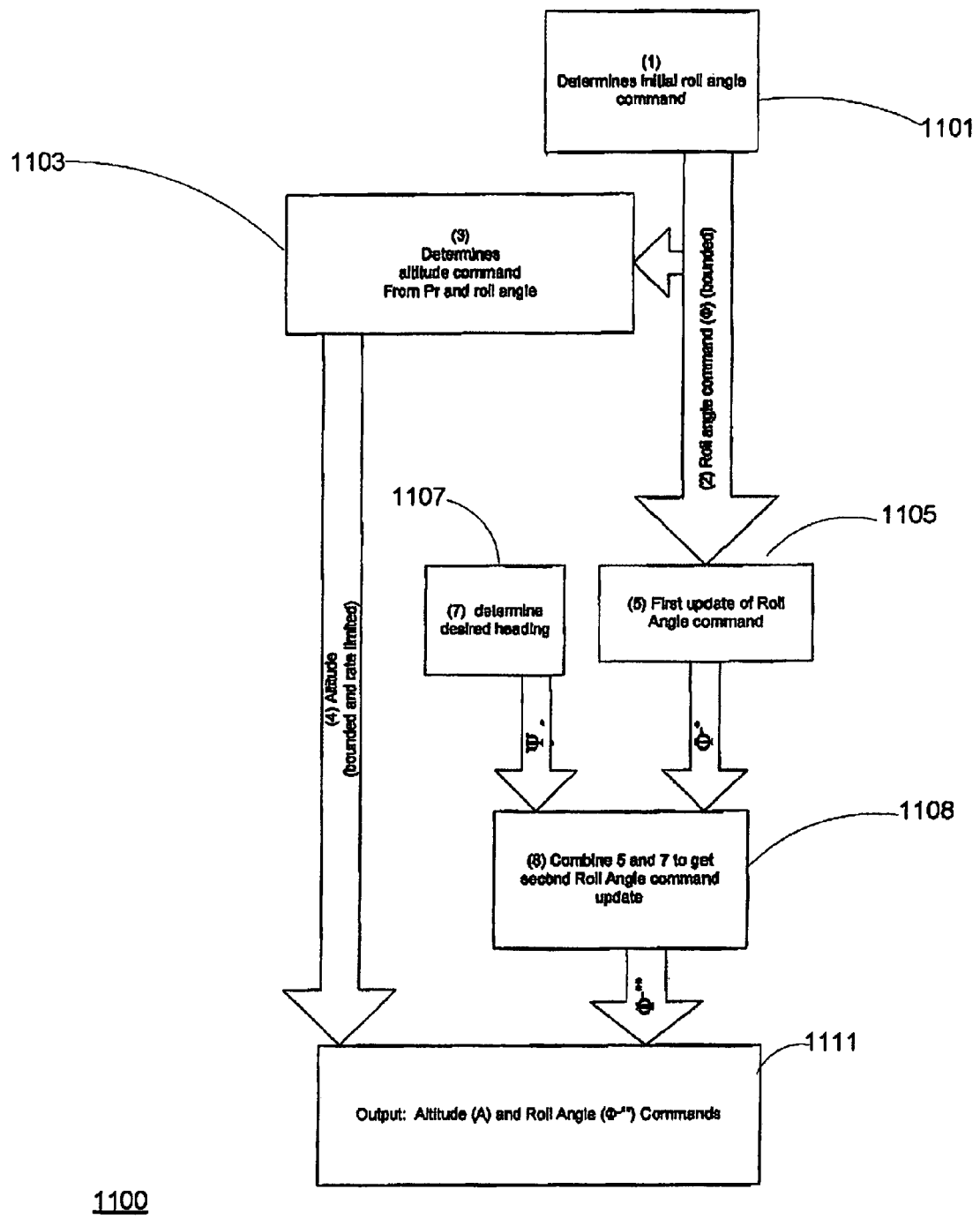
FIG. 11 shows a flow diagram for path planner algorithm software according to an embodiment of the invention.

FIG. 4 shows apparatus 400 for controlling unmanned aerial vehicle (UAV) 401 with moving ground station 403 according to an embodiment of the invention. Apparatus 400 comprises UAV 401 and moving ground station 403, which may correspond to a car/truck (e.g., vehicle 12 as shown in FIG. 1). UAV provides measurements, e.g., location and velocity information over telemetry communications channel 411. Moving ground station provides path commands (that may be determined by a path planner algorithm as shown in FIG. 11) to UAV 401 over wireless communications channel 413. In the embodiment, moving ground station 403 receives location and velocity information from UAV 401 and determines its own location and velocity information. In the embodiment, moving ground station 403 determines its location and velocity using information received from a GPS receiver. This information 415 is passed to path planner algorithm software 407 through telemetry interface 409. As will be discussed with FIG. 11, path planner algorithm software 407 determines values for control variables 417 that instruct UAV 401 to travel on a desired path (e.g., a circular path around moving ground station 403). Telemetry interface 409 inserts command information into radio messages that are sent to UAV 401 over wireless communications channel 413. UAV 401 processes received radio messages to extract values of control variables and passes the extracted values to autopilot hardware and software 405 to instruct the propulsion system to travel on the desired path.

Figure 5:
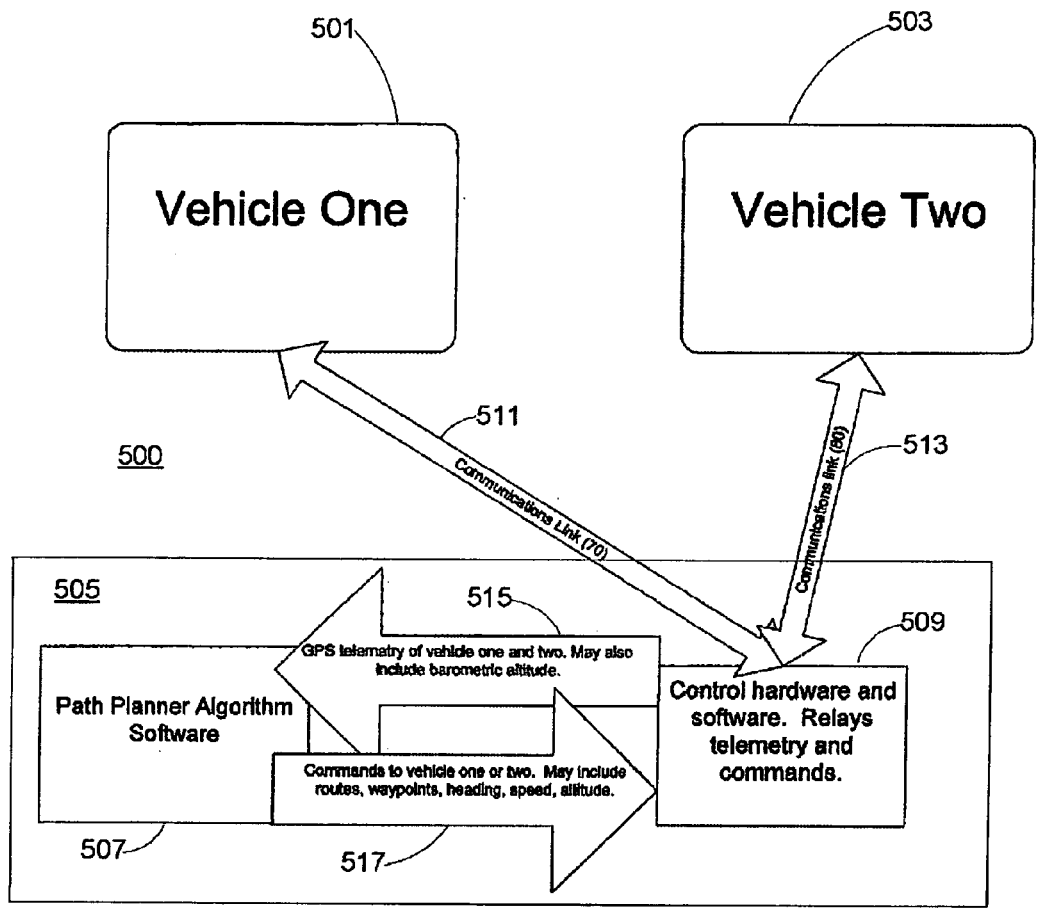
FIG. 5 shows an apparatus for controlling two vehicles from a controlling entity according to an embodiment of the invention.

FIG. 5 shows apparatus 500 for controlling two vehicles 501 and 503 from controlling entity (central controller or control center) 505 according to an embodiment of the invention. In an example of the embodiment, vehicle 501 corresponds to a surveillance vehicle (e.g., UAV 10 as shown in FIG. 1), vehicle 503 corresponds to a convoy vehicle (e.g. vehicle 12), and control center 505 has a fixed position. Control center 505 communicates with vehicle 501 and vehicle 503 over communications channels 511 and 513, respectively. Control center 505 receives position and velocity information from both vehicles 501 and 503 through communication interface 509, which passes the information 515 to path planner algorithm software 507 that implements the flow diagram as shown in FIG. 11. Path planner algorithm software 507 determines values of control variables 517, which are sent to vehicle 501 and/or vehicle 503 so that vehicle 501 maintains a desired path with respect to vehicle 503.

Figure 6:
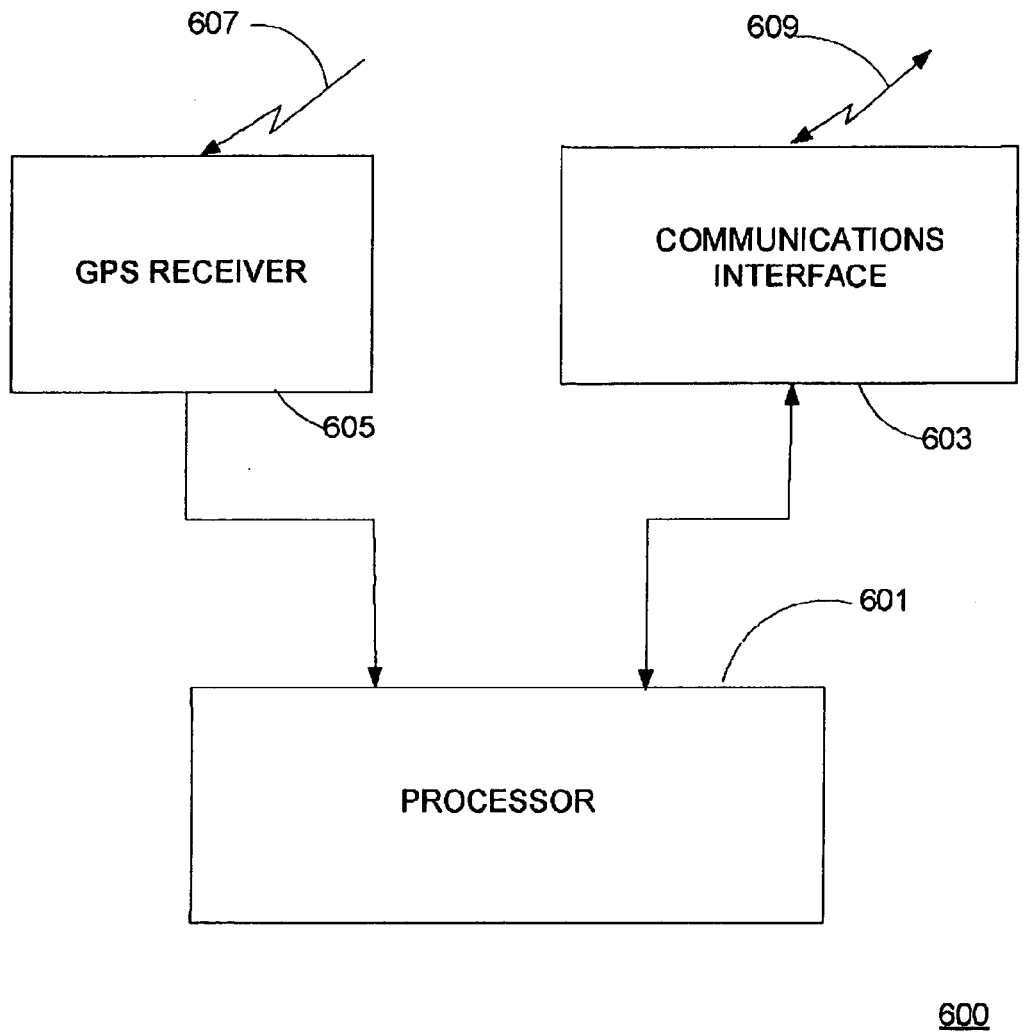
FIG. 6 shows an apparatus for a controller according to an embodiment of the invention.

FIG. 6 shows apparatus for a controller 600 (e.g., moving ground station 403 or control center 505) according to an embodiment of the invention. Controller 600 comprises processor 601, communications interface 603, and GPS receiver 605. Embodiments of the invention may utilize an inertial navigational system (e.g., a gyroscopic navigational system) to determine position and velocity information. Processor 601 receives position and velocity information from a surveillance vehicle (not shown) through communications interface 603 over wireless communications channel 609. The embodiment supports a variety of wireless communications channels including light, microwave, infrared, and sonar communication channels. In addition, controller 600 obtains position and velocity information from a convoy vehicle for a configuration corresponding to apparatus 500 or obtains its own position and velocity information for a configuration corresponding to apparatus 400. For a configuration in which controller 600 determines its own position and velocity information, controller 600 typically obtains GPS information from GPS receiver 605 over radio channel 607. Processor 601 implements a path planner algorithm to determine values for control variables. The values for the control variables are sent to the controlled vehicles through communications interface 603 over wireless communications channel 609.

Figure 7:
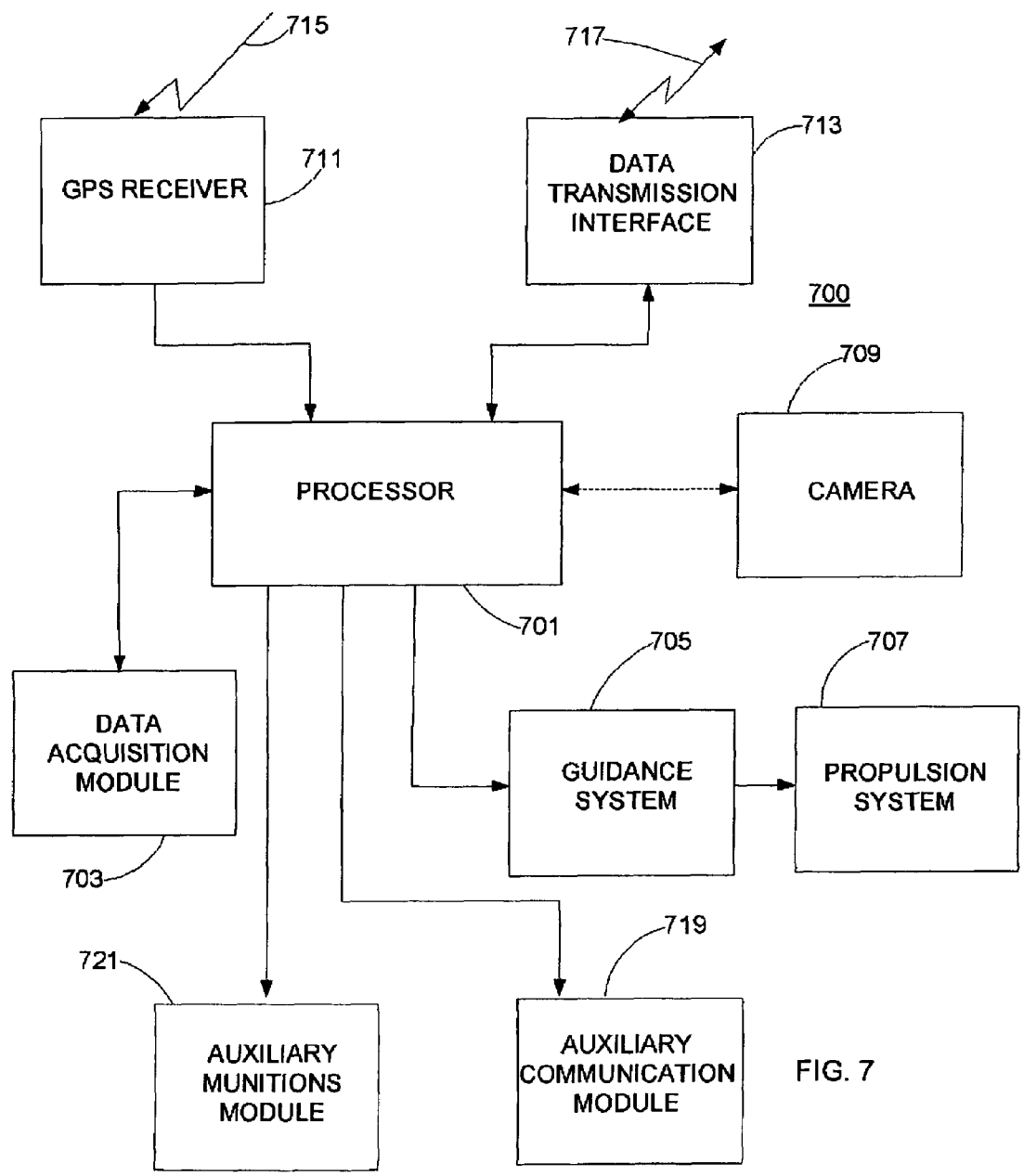
FIG. 7 shows an apparatus of an unmanned aerial vehicle according to an embodiment of the invention.

FIG. 7 shows a schematic diagram of an apparatus of unmanned aerial vehicle 700 according to an embodiment of the invention. UAV 700 includes propulsion system 707 and guidance system 705 which powers and guides UAV 700 in its desired path, respectively. UAV 700 receives instructions through data communications interface 713 over wireless communication channel 717 from a controller (e.g., controller 600) that contains values for control variables. Processor 701 extracts and processes the instructed values from the received instructions. Processed values are presented to guidance system 705 so that UAV 700 follows the desired path.

UAV 700 determines position and velocity information about itself from GPS information received by GPS receiver 711 over radio channel 715 and from data acquired by data acquisition module 703. The embodiment also supports methods that determine position and velocity of UAV 700, e.g. triangulation techniques, that are known in the art. UAV 700 sends the position and velocity information to the controller through data transmission interface 713.

UAV 700 collects surveillance images through camera 709 and transmits the images to a convoy vehicle through data transmission interface 713 over wireless communication channel 717. UAV 700 may include auxiliary munitions module 721 that is equipped with one or more smoke grenades that may be released to identify potential ambush sites, with air-to-air missiles, and the like. Also, UAV 700 may include auxiliary communication module 719 to provide jamming of an adversary's communications channel or to provide an auxiliary wireless channel to supplement data transmission interface 713.

Embodiments of the invention may implement the path planner algorithm at the controller. The controller may be located at different locations for different configurations. For example, the controller may correspond to vehicle 12 (as shown in FIG. 1), ship 22 (as shown in FIG. 2), moving ground station 403 (as shown in FIG. 4), or control center 505 (as shown in FIG. 5).

Another embodiment of the invention may implement the path planner algorithm software in the UAV rather than in the controller. In such cases, the UAV receives position and velocity information about the convoy and path parameters about the desired path. The UAV internally determines values for the control variables rather than receiving the values from the controller.

Computer Hardware and Software

In one implementation, the UAVs disclosed herein use the CloudCap autonomous flight control platform. A Software Developer Kit (SDK) enables third-party applications to interface with the Piccolo software for purposes of flight control, data acquisition, and payload data transmission. The system interfaces a UAV control system to the platform via this SDK, providing integration of the high-level adaptive behavior control system with a low-level autonomous control system and communication link.

Path Planning Algorithm

A path planning algorithm allows a UAV (e.g., an airplane) to remain at a relatively fixed distance in front of the convoy vehicle (e.g., a car or a boat) or around the convoy vehicle when the velocity of the UAV, $v_{UAV}$, is faster than the velocity of the boat, $v_{CONVOY}$. The following description relates to an algorithm for identifying a path of an unmanned aerial vehicle in relation to a ground vehicle.

Unmanned aerial vehicle (UAV) travels a curvilinear path 360° around a convoy, which comprises at least one ground vehicle or at least one water vehicle. A camera that is mounted on the UAV points at the convoy. A nominal distance between the UAV and the convoy is user controllable. Also, the algorithm is cognizant of aircraft operational considerations that must not be exceeded.

In an example of the embodiment, the UAV is constrained to an airspeed between 30 knots and 55 knots, a vertical speed of less than 500 ft/min, a roll angle of less than 28 degrees, a mounted camera pointing at "9 o'clock" and 25 degrees below horizon (left wing), and a camera field of view of 46 degrees horizontal with a 4:3 (NTSC) frame shape.

Figure 8:
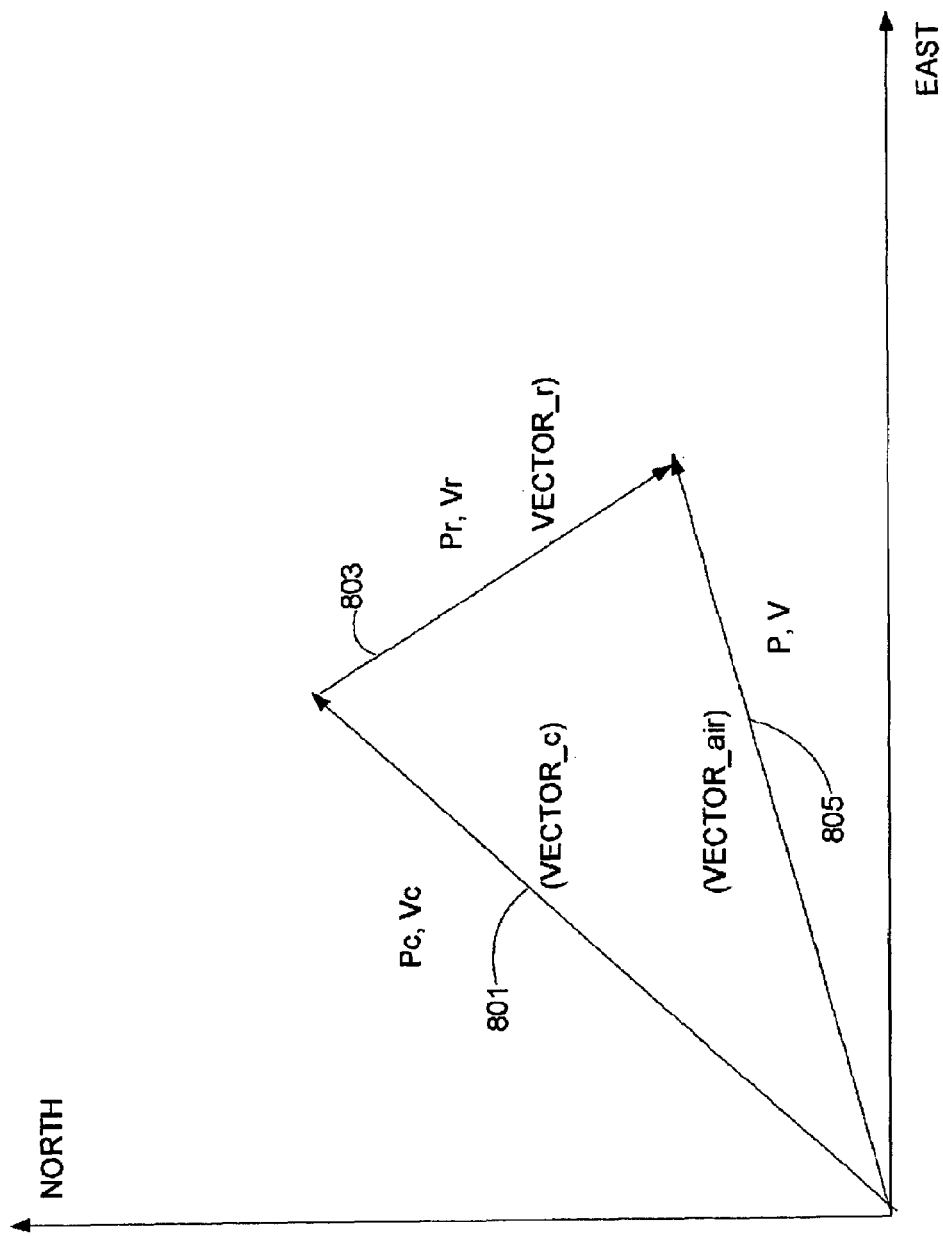
FIG. 8 shows a relationship between convoy position and aircraft position according to an embodiment of the invention.

FIG. 8 shows a relationship between convoy position and aircraft position according to an embodiment of the invention. Vector 805 represents the aircraft position P (or velocity V), vector 801 represents the convoy position $P_c$ (or convoy velocity $V_c$), and vector 803 represents the relative position $P_r$ (or relative velocity $V_r$). In the example shown in FIG. 8, vectors 801, 803, and 805 are represented in East, West coordinates at a relative true altitude.

Figure 9:
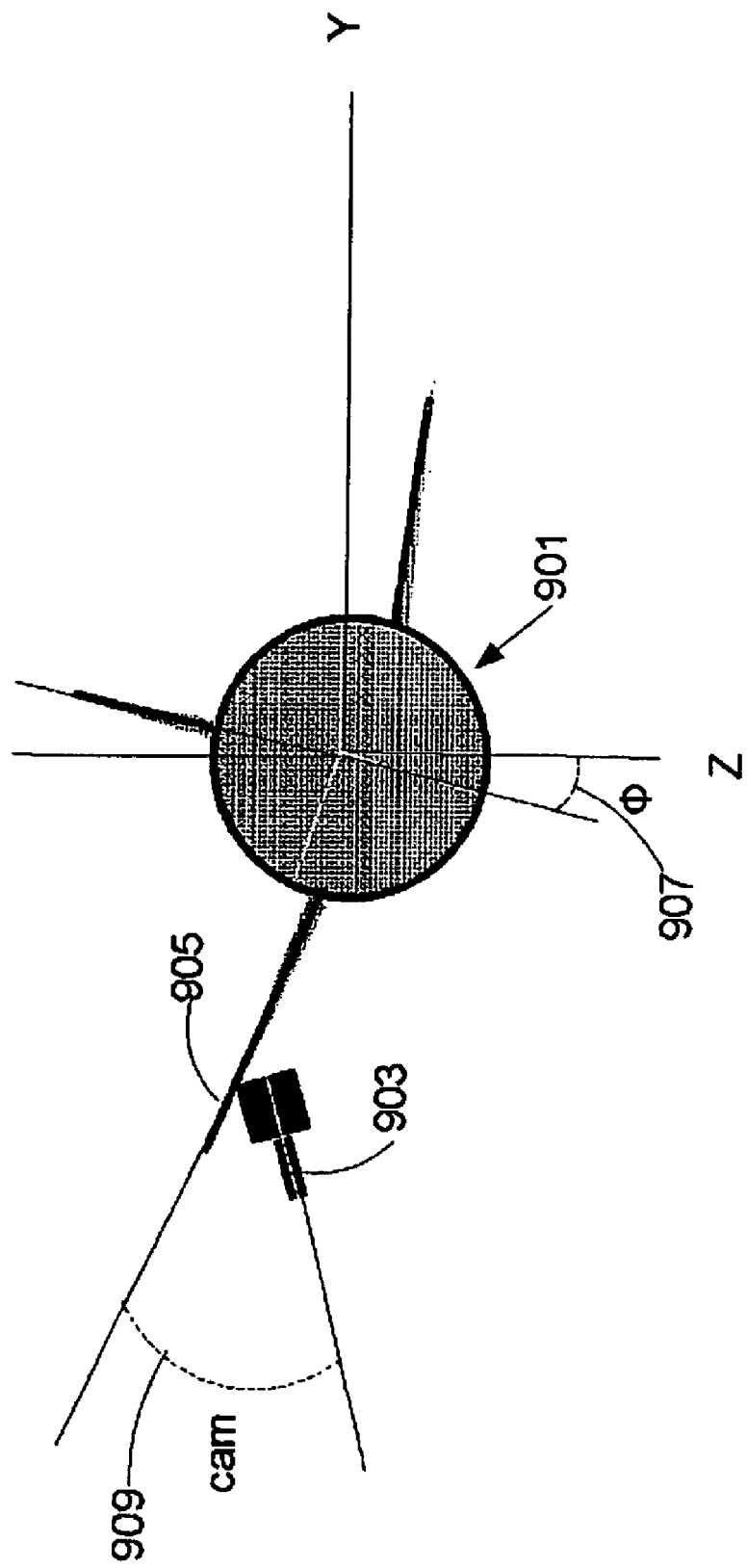
FIG. 9 shows a front view of an unmanned aerial vehicle according to an embodiment of the invention.

FIG. 9 shows a front view of unmanned aerial vehicle (UAV) 901 according to an embodiment of the invention. Camera 903 is mounted on left wing 905 at cam angle (camera angle) 909. By way of example, the nominal camera angle is approximately 25 degrees. The roll angle is represented as roll angle (Φ) 907.

Figure 10:
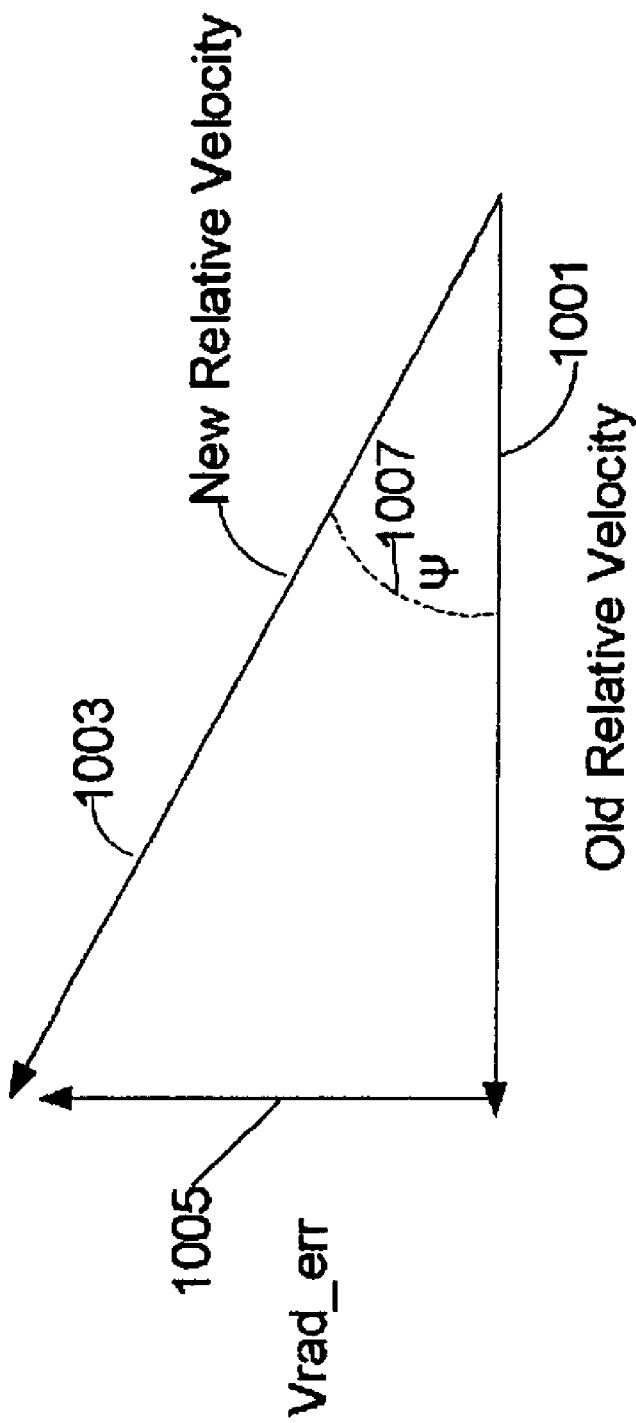
FIG. 10 shows the relationship between relative velocity and the radial error velocity according to an embodiment of the invention.

FIG. 10 shows the relationship between relative velocity and the radial error velocity according to an embodiment of the invention. Vector 1001 represents the old relative velocity ($V_r$) and vector 1003 represents the new relative velocity 1003, which is related with vector 1001 by vector 1005. Vector ($V_{rad\_err}$) 1005 represents the error in the radial velocity. Angle ψ 1007 is the angle between vector 1001 and vector 1003 and corresponds to the heading change. The objective is to reduce $V_{rad\_err}$ 1005 with heading changes. (Ideally, one chooses angle ψ 1007 to make $V_{rad\_err}=0$ so that:

$$\psi = a\sin\{V_{rad\_err}/\|V_r\|\} \quad \text{(Equation 1)}$$

if $|V_{rad\_err}| < \|V_r\|\sin(\text{max\_angle})$. Otherwise, $$\psi = \text{sign}(V_{rad\_err})\text{max\_angle} \quad \text{(Equation 2)},$$

where max_angle is the maximum bank angle.

FIG. 11 shows flow diagram 1100 for path planner algorithm software according to an embodiment of the invention. In flow diagram 1100, the following nomenclature is used:

| | |
|---|---|
| Φ⁻ | roll angle command |
| Φ⁻* | first roll angle command update |
| Φ⁻** | second roll angle command update |
| $V_a$ | aircraft true airspeed |
| g | gravity constant |
| $P_r$ | relative position (aircraft to convoy) |
| $P_d$ | desired radial range |
| A | altitude command |
| cam | camera angle |
| Gain | control constant |
| $V_{rad\_err}$ | error in radial velocity |
| max_angle | maximum bank angle |
| ψ | heading angle command |

In step 1101, the initial roll angle command is determined by:

$$\Phi^- = a\tan\{V_a \cdot V_r/(g\|P_r\|)\} \quad \text{(Equation 3)}$$

The roll angle (Φ⁻) command may be bounded (saturated) so that a maximum roll angle (which is dependent upon the constraints of the aircraft) is not exceeded before proceeding to step 1105. In step 1105, the first update of the roll angle command is determined by:

$$\Phi^{-*} = \Phi^- + (\pi/2 - a\cos\{V_a \cdot P_r/(\|V_a\|\|P_r\|)\}) \quad \text{(Equation 4)}$$

If $|V_{rad\_err}|/\|V_r\|\sin(\text{max\_angle})$, step 1107 determines the desired heading by:

$$\psi = a\sin\{V_{rad\_err}/\|V_r\|\} \quad \text{(Equation 5)}$$

Otherwise, step 1107 determines the desired heading by:

$$\psi = \text{sign}(V_{rad\_err})\text{max\_angle} \quad \text{(Equation 6)}$$

In step 1108, the second update roll angle command is determined by:

$$\Phi^{-**} = \Phi^{-*} - \psi \quad \text{(Equation 7)},$$

where Φ⁻* is determined from Equation 4 and ψ is determined from Equations 5 and 6.

In step 1103, the altitude (A) command is determined from $P_r$ and roll angle by:

$$A = \|P_r\| \tan(\Phi^- + cam), \quad \text{(Equation 8)},$$

where $\Phi^-$ is determined from Equation 3.

Figure 19:
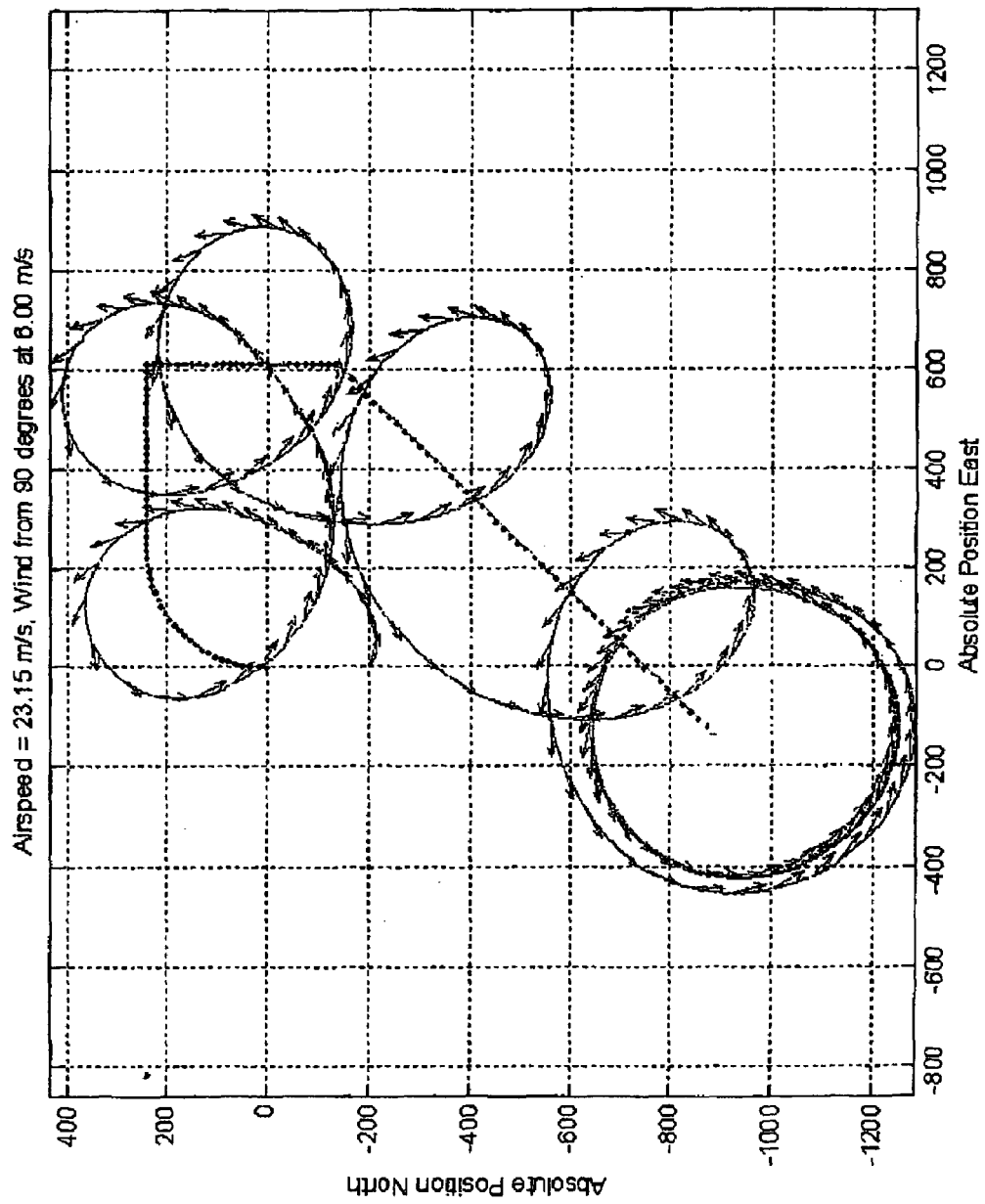
FIG. 19 shows a simulation of the path determination algorithm according to an embodiment of the invention.

In step 1111, values of control variables (altitude and roll angle commands) are provided to the guidance system (e.g., guidance system 705 as shown in FIG. 7) so that the surveillance vehicle follows a desired curvilinear (at least in part), closed-loop path with respect to the convoy vehicle. If the surveillance vehicle is not initially traveling on the desired path, the vehicle's path will converge to the desired path as illustrated in FIG. 19.

An embodiment of the invention includes the path controller algorithm as well as the software tool that has been developed for an easy development of this kind of controllers for the Piccolo systems.

Due to the time-consuming process of flight-testing, a simulation environment of the airplane and the ground vehicle is desirable for the development of path controllers. An embodiment provides an aircraft simulation environment, which incorporates a portion of the flying hardware. To complete the simulation environment, a ground vehicle model, the car model, is developed.

The controller development platform (CDP) is a software kit that assists with the development and testing of UAV mission feasibilities. The path controller software developed by this kit ultimately resides on a computer that is connected to the ground station. Since the airplane can be simulated by the simulator, only a ground vehicle simulator needs to be constructed in the CDP.

The CDP may provide all the necessary information for path generation, from the aircraft data to the ground station data. This information may take on the form of packets of structures. The CDP has already written the "de-multiplexer" portion of the software that deciphers and stores the serial data from the ground station. These data is extracted and fed into the path-planning algorithm that computes and returns future navigation points. The future navigation points are then packed into a package and then sent to the ground station. The packaging and the serial communication functions may be provided by the CDP.

Figure 12:
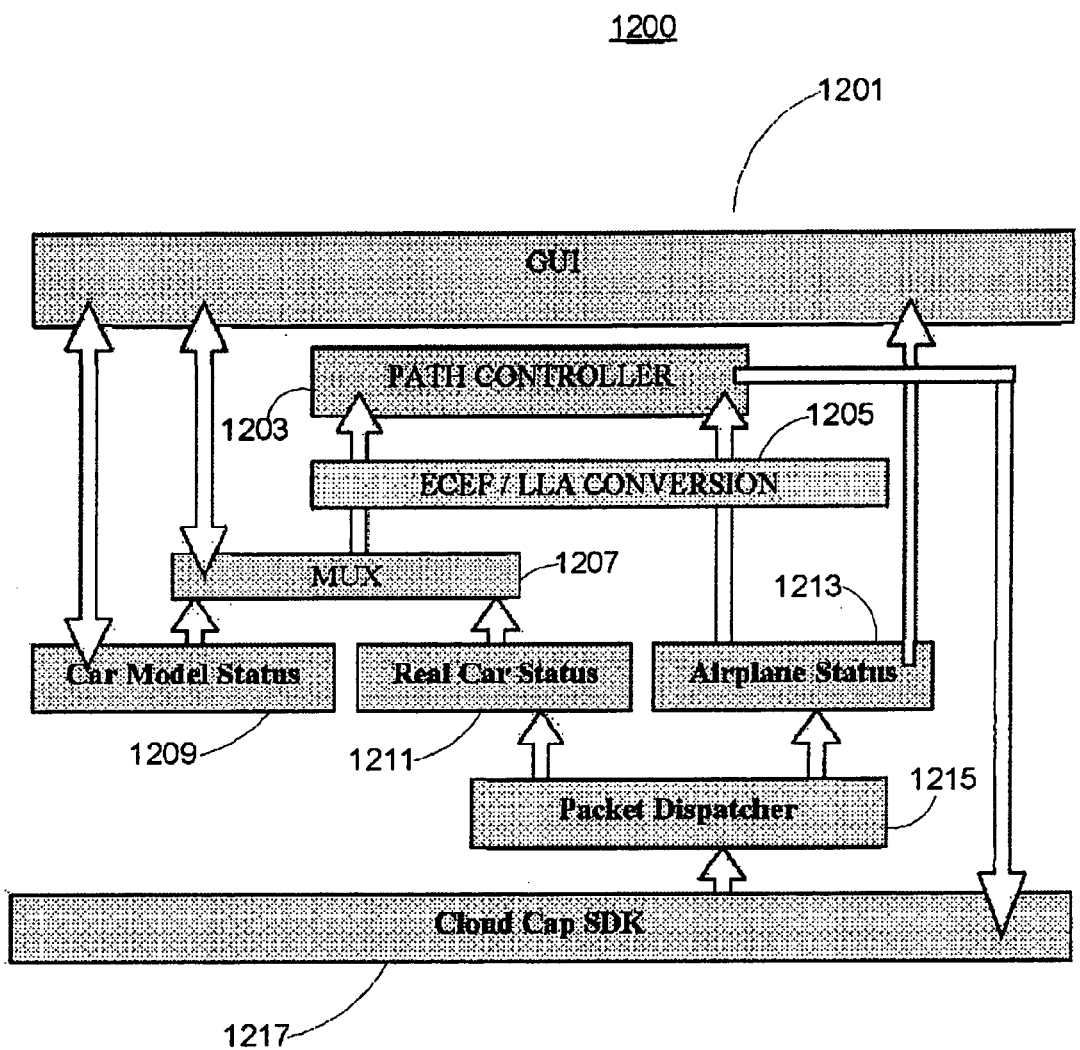
FIG. 12 shows an exemplary architecture for controlling an unmanned aerial vehicle according to an embodiment of the invention.

As an example, FIG. 12 is a schematic diagram of a simulation architecture. The bottom layer, Cloud Cap Communication SDK 1217 is a library that provides communication primitives between the controller and the ground station through serial port. The library comes with a packet dispatcher. Inside this module a routine is nested that forwards the packet received from the ground station to the correct modules.

The packets are passed to two modules: real car status module 1211 and airplane status module 1213. Modules 1211 and 1213 keep track of the status of these vehicles by extracting the data from the packet forwarded to them by packet dispatcher 1215.

Car model module 1209 maintains the status of a simulated car. The information is the same as those that are kept by real car status module 1211.

MUX module 1207 simple decide which set of data to fetch to the open loop controller 1203. In the testing phase the data is taken from car model module 1209; in the real ground test the data is taken from real car module 1211.

EECF/LLA conversion module 1205 supports the conversion between the data format used by the ACR system (GPS Longitude Latitude Altitude format) into a format more suitable for the development of the controller (Earth Centered Earth Fix).

The interaction between the user and the application is managed through a GUI module 1201 that displays a subset of the information fetched to controller 1203. The user can monitor the performances of controller 1203 observing the displayed trajectory of the airplane and the car and reading the list of the waypoint that are sent. The user commands MUX 1207 and sets the Car Model parameters through GUI 1201.

Path controller module 1203 is implemented by the developer. The necessary data is extracted from the packets from MUX module 1207, which has been converted into the appropriate format by ECEF/LLA Conversion module 1205. The data provided for this module includes: airplane position, altitude, and airspeed (true air speed as well as from the GPS receiver). After computing future waypoints, path controller module 1203 returns a list of waypoints that are in the LLA format used by the Piccolo. The future waypoints come in packages of three, which is chosen guard against communication packet loss. The packaging of waypoints is done by routines provided by the Cloud Cap Communication SDK library, which also sends the routes to the ground station. The ground station ultimately forwards these packets to the airplane.

Coordinate Transformations

Figure 13:
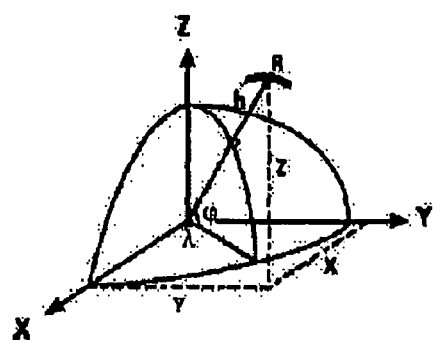
FIG. 13 shows how an object in the sky can be represented in Earth-Centered, Earth-Fixed (ECEF) coordinates according to an embodiment of the invention.

Global Positioning System (GPS) for the car and the plane's location uses the Cartesian coordinate system called Earth-Centered, Earth-Fixed (ECEF). FIG. 13 shows how an object, R, in the sky can be represented in ECEF coordinates, x, y, and z. Here, the axes X, Y, and Z are fixed with respect to the earth where their origins are the earth's center of gravity and Z-axis is coming out through the North Pole.

Figure 14:
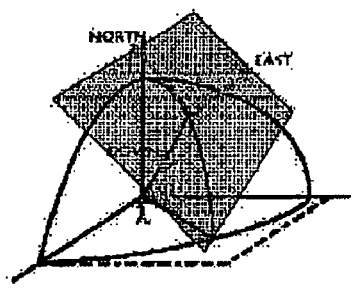
FIG. 14 shows how an object can be represented in a Local Tangent Plane (LTP) from the ECEF coordinates according to an embodiment of the invention.

Given ECEF coordinate system, it is represented in Local Tangent Plane (LTP) which uses the orientation, North, East, and Down (into the Earth) where it considers the Earth's local surface being projected onto the gray plane as shown in FIG. 14. The calculation of this relation is shown as follows:

$$\begin{bmatrix} \text{North} \\ \text{East} \\ \text{Down} \end{bmatrix} = \begin{bmatrix} -\sin(phi) \cdot \cos(lam) & -\sin(phi) \cdot \sin(lam) & \cos(phi) \\ -\sin(lam) & \cos(lam) & 0 \\ -\cos(phi) \cdot \cos(lam) & -\cos(phi) \cdot \sin(lam) & -\sin(phi) \end{bmatrix} \cdot \begin{bmatrix} X \\ Y \\ Z \end{bmatrix}$$

Figure 15:
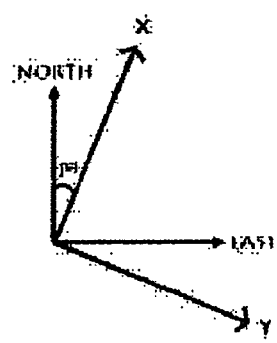
FIG. 15 shows transforming LTP coordinates to a local car's Cartesian (LOCA) coordinate system according to an embodiment of the invention.

LTP coordinates are transformed to local car's Cartesian (LOCA) coordinate system as show in FIG. 15. (Note: Down-axis and the z-axis are pointing into the paper and not shown in FIG. 15.) Generating plane path in this coordinate system allows simple manipulation in the code. For example, by placing an imaginary point in x-direction (car's heading) by 5 meters, the point will always be in front of the car by 5 meters in ECEF and LTP coordinate system. Below, equation for transforming LTP to LOCA is shown as follows:

$$\begin{bmatrix} x \\ y \\ z \end{bmatrix} = \begin{bmatrix} \cos(psi) & -\sin(psi) & 0 \\ \sin(psi) & \cos(psi) & 0 \\ 0 & 0 & 1 \end{bmatrix} \cdot \begin{bmatrix} \text{North} \\ \text{East} \\ \text{Down} \end{bmatrix}$$

In the implementation, a function transf(x,y,z,ret,flag) transforms these different types of coordinate system to another with a specified flag.

Implementing the Theory of Path Generation

First, the current status of the ground speed and the position of the plane, car, and the wind are received from the main code in a structure format named path_generator_input.

Second, psi, lam, phi (for coordinate transformations), (car_speed $v_b$), (plane_speed $v_p$) are calculated as follows:

$$psi = \tan^{-1}\left(-\frac{car\_speed\_east}{car\_speed\_north}\right)$$

$$lam = car\_longitude \cdot \pi/180$$

$$phi = car\_latitude \cdot \pi/180$$

$$Car\_speed = \sqrt{car\_speed\_north^2 + car\_speed\_east^2}$$

$$Plane\_speed = \sqrt{airplane\_speed\_north^2 + airplane\_speed\_east^2}$$

Third, if the ratio of the velocities (σ) of the plane and the car is greater than some threshold (in an embodiment equal to 3), the function circle_path( ) is called to allow the plane to fly in circles above the car, and otherwise, a non-circular path is generated by desired_path( ). This eliminates the need for the plane to fly in extraneously large amplitudes of sinusoidal path when the car is moving slowly.

Fourth, in the function desired_path( ), the plane's future paths are generated with the consideration of communication speed and car's current position. The current implementation does not consider the real plane's position and assumes that the plane is following the path correctly.

Figure 16:
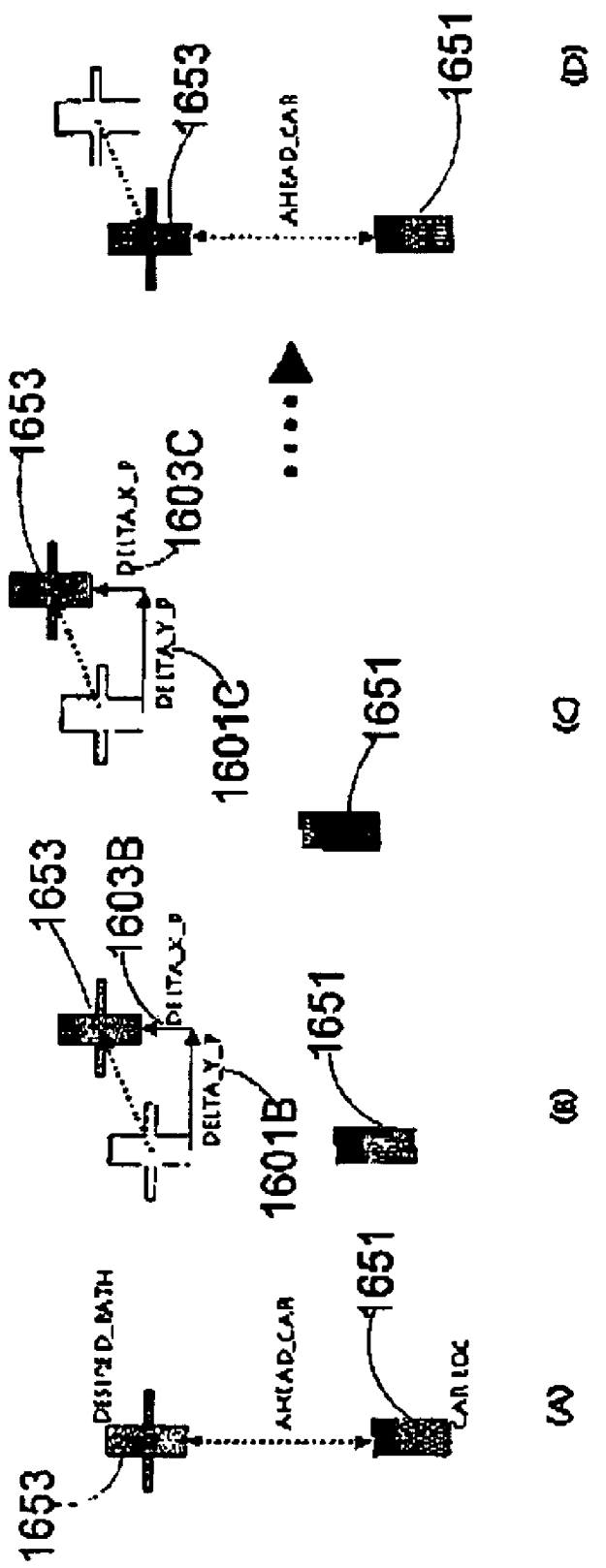
FIGS. 16A-D show an unmanned aerial vehicle's path relative to a car's path according to an embodiment of the invention.

As shown in FIG. 16A, The plane's desired path 1653 initially starts in front of the car 1651 by a predefined value, AHEAD_CAR. This can be done by adding the offset, AHEAD_CAR, to the car's position in x-direction in LOCA coordinate system.

Vectors delta_x_p 1601B, 1601C and delta_y_p 1603B, 1603C are calculated every second, then they are transformed to ECEF coordinates which then they will be added to the previous position of the plane as shown in FIGS. 16B and 16C. Because all the calculations are done in LOCA coordinates before transforming it to ECEF coordinates, this allows the path to turn its direction as the car turns. And the delta in z-direction is set to zero to maintain the height of the plane from its initial condition. Then these X, Y, and Z points will be sent to the main function in a structure format named path_generator_output, which then it will be sent to the Piccolo box.

Finally, as the plane comes back and crosses the car's track again (as shown in FIG. 16D) it initializes the plane's new desired points to be in front of the car by AHEAD_CAR. This is required since when the car makes turns, it displaces the plane's location in x-direction (in LOCA) that needs to be compensated by this process.

Hardware in the Loop Simulation Setup

A simulation setup may be used to test the feasibility of the path-planning algorithm. A hardware-in-the-loop (HIL) simulation environment may be used. During the simulation, the ground station, the ground station computer, and the airborne avionics (the Piccolo box) are all incorporated into the process. However, unlike during actual flight, the Piccolo box sends its commands into a controller area network (CAN) bus instead of the servos that would maneuver the UAV. The CAN bus translates the avionics' control information into serial communication and feeds the signals into the USB port of a computer that is running aircraft simulation software. The simulation software runs a model of an aircraft by taking in the control inputs from the CAN bus. The model describes the aircraft by a set of parameters that is gathered empirically. The simulation program calculates the responses of the aircraft, such as GPS position, airspeed, and acceleration, and returns them back to the Piccolo box. This data is then returned via the wireless link back to the ground station, which is available for use or for recording purposes. This simulation process most directly tests the feasibility of the entire system by incorporating factors such as the wireless and serial communications as well as the path-planning algorithm all at once.

Figure 17:
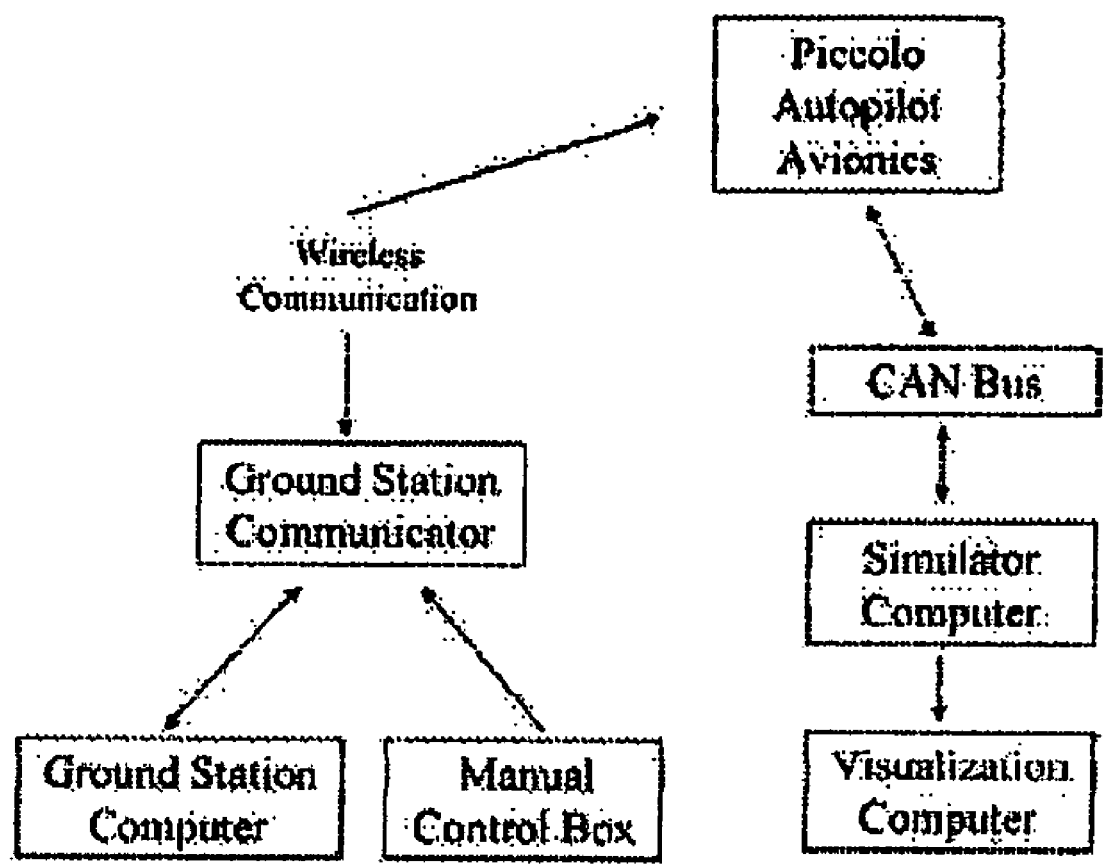
FIG. 17 shows apparatus for simulating an unmanned aerial vehicle according to an embodiment of the invention.

The simulator has visualization capability that provides a more intuitive feel of the behavior of the aircraft. The simulation sends out UDP packets, which contains the position and the Euler angles of the aircraft, to a designated visualization computer. These packets are then process by software such as FlightGear or Microsoft Flight Simulator for viewing. Due to the high demand of processor power for visualization, a computer independent from the simulator computer is used. A diagram of the simulation setup is shown in FIG. 17.

Car Model Simulation Implementation

Trajectories are identified in real-time so that, when followed by a UAV, the UAV will stay in the vicinity of a designated ground vehicle. A ground station is mounted onto the designated ground vehicle. However, for simulation purposes, a car model is devised to feed into the path-planner program pseudo information of the ground vehicle. The car model is built by keeping track of the position as well as the velocity vector of the simulated car. The model resides in a software loop that is run once per second. The position of the car is updated by Equation 9 and 10:

Car_Latitude(T+1)=Car_Latitude(T)+Car_north_
  speed_LL*deltaT  (Equation 9)

Car_Longitude(T+1)=Car_Longitude(T)+Car_east_
  speed_LL*deltaT  (Equation 10)

where the position of the car model is reported in degrees of latitude and longitude. Since the algorithm is run once every second, an update of the car model's position occurs at 1 Hz, and so the deltaT variable in Equations 9 and 10 is set to one.

The car model's velocity vector has a size as well as a directional component, and they are modified by the clicks of buttons on the path-planner's graphic user interface (GUI). The equation for changing the velocity magnitude and direction information is reproduced in Equations 11 and 12 respectively below:

Car_Heading(new)=Car_Heading(current)±delta_
  Car_Heading  (Equation 11)

Car_Speed(new)=Car_Speed(current)±delta_
  Car_Speed  (Equation 12), where the Car_Heading variable has the units of radians and the Car_Speed variable has the units of meters per second. Each time a button is clicked on the GUI, the variables are manipulated by a certain preset amount, which is specified by constants delta_Car_Heading and delta_Car_Speed. The delta_Car_Heading was set to be seven point five degrees; and so every time the user clicks on the "right-turn" or "left-turn" button on the GUI, the Car_Heading variable increases or decreases by 7.5 degrees respectively. As for the speed information, each click of the "accelerate" or "decelerate" button would increase or decrease the Car_Speed variable by an amount of delta_Car_Speed. The delta_

Car_Speed variable is chosen to be two miles per hour, which translates to roughly 0.477 meters per second. Since the heading and speed information is changed every time a button click has occurred, one can think of the changes as having units of "7.5 degrees per click" and "0.477 [m/s] per click" for the heading and the speed respectively.

Translating from Car_Heading and Car_Speed information to Car_north_speed_LL and Car_east_speed_LL is a two-step procedure. First, the north and the east components of the velocity vectors are extracted from the Car_Heading and Car_Speed information. Then, each of the components is translated from meters per second into degrees per second. Notice the "LL" attached to the tail of the velocity components in Equations 11 and 12, which means "in latitude and longitude." The first step is accomplished by Equations 13 and 14 below:

$$\text{Car\_north\_speed} = \text{Car\_Speed} * \text{COS}(\text{Car\_Heading}) \quad \text{(equation 13)}$$

$$\text{Car\_east\_speed} = \text{Car\_Speed} * \text{SIN}(\text{Car\_Heading}) \quad \text{(equation 14)}$$

Since the velocity components are still in the units of meters per second, the second step is to translate them into degrees per second. This step is achieved by first dividing each of the velocity components by the radius of the earth, and then multiplying each by $180/\pi$ to attain the units of degrees. This procedure is performed per Equations 15 and 16 below:

$$\text{Car\_north\_speed\_LL} = (\text{Car\_north\_speed}/rLat) * 180/\pi \quad \text{(Equation 15)}$$

$$\text{Car\_east\_speed\_LL} = (\text{Car\_north\_speed}/rLon) * 180/\pi \quad \text{(Equation 16)}$$

Figure 18:
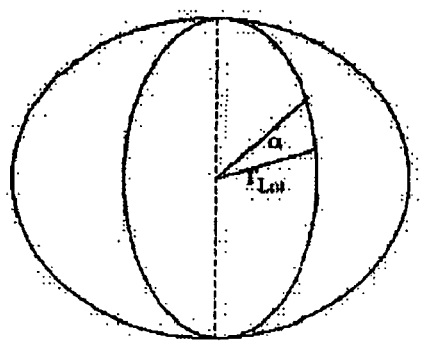
FIG. 18 shows the determination of the change of latitude and longitude according to an embodiment of the invention.
Figure 18:
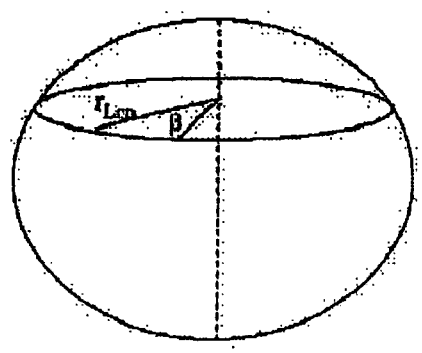

There are two different radii because the car model travels in a different circle when traveling in a north-south direction than in an east-west direction. FIG. 18 illustrates these points.

The initial position of the car model takes on the latitude and longitude values of the simulated aircraft at the moment that the simulator is started. By knowing the latitude of the aircraft, the $r_{Lat}$ and $r_{Lon}$ in FIG. 18 may be found using known parameters of the earth and trigonometry. The earth datum is defined per the World Geodetic System 1984 (WGS84). Once the radii are found, the angular velocity of the north and east components may be found. By multiplying the angular velocities by the deltaT in Equations 9 and 10, the angular contribution, the $\alpha$ and the $\beta$ of FIG. 18, may be found, which is used in Equations 9 and 10 to update the change in the simulated car's position.

In order to switch between the simulation and the real-world scenarios, a pre-compiler flag arrangement is used. Depending on how this flag is set, the compiled executable sends either the actual or the simulated car data to the path generation algorithm.

FIG. 19 shows a simulation of the path planner algorithm software as shown in the flow diagram in FIG. 11. While the simulated UAV does not initially have a circular path, the simulated UAV does converge to a circular path having a desired radial distance. The simulation shown in FIG. 19 demonstrates the robustness of the path determination algorithm to the effects of wind. In FIG. 19, the simulated wind is from the direction of 90 degrees at 6.00 m/sec, and the airspeed of the simulated UAV is 23.15 m/sec.

Figure 20:
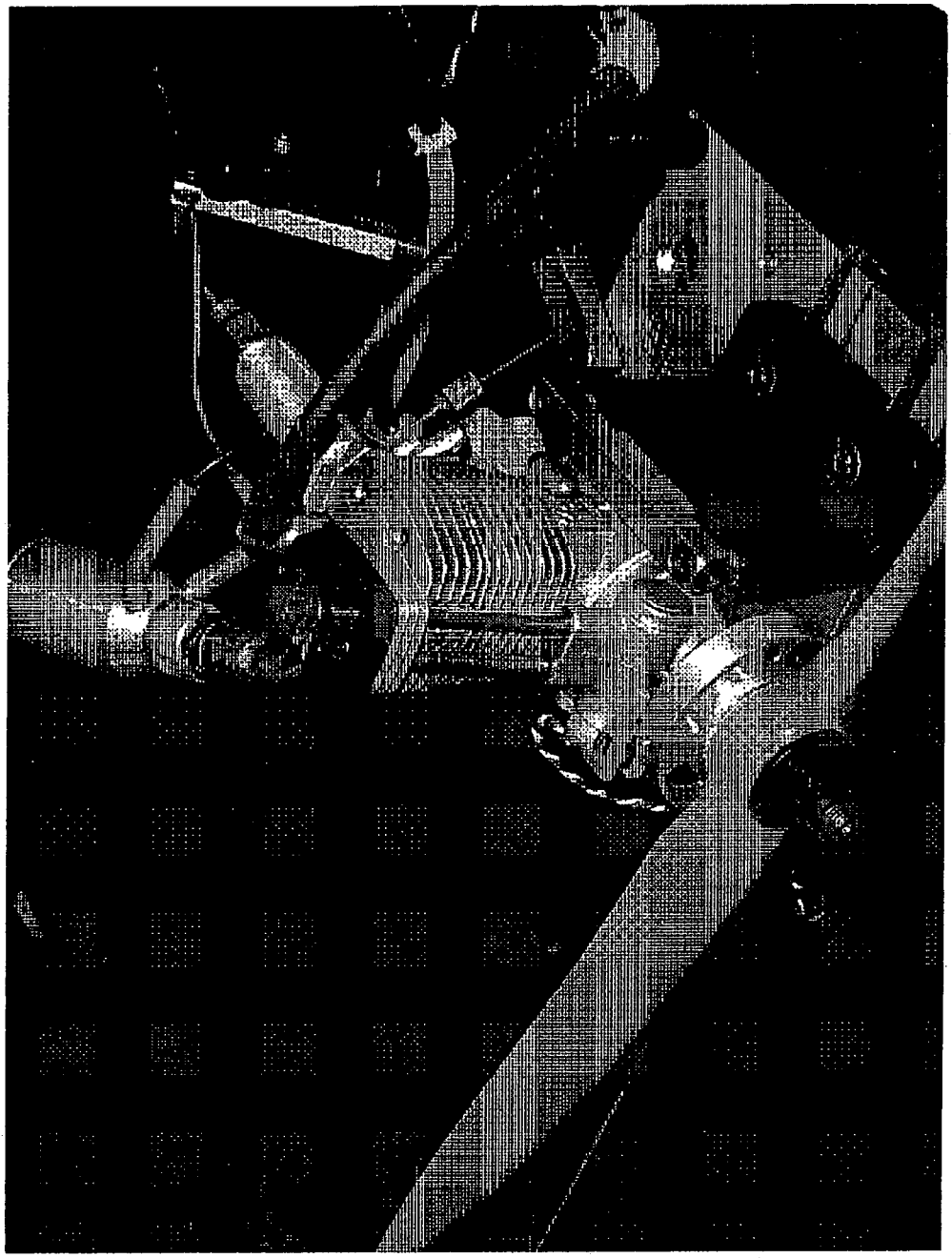
FIG. 20 shows a heavy fuels engine that propels an unmanned aerial vehicle according to an embodiment of the invention.

FIG. 20 shows a heavy fuels engine that propels an unmanned aerial vehicle according to an embodiment of the invention. Just behind the propeller is the ignition timing ring that contains a magnet that triggers the ignition to fire at the proper time in the operational cycle. The twisted wire on the right side of the front of the engine (as viewed from the back of the engine) is the wire going from the Hall Effect sensor that triggers the ignition system. The ignition system itself is outside the frame of FIG. 20. The ignition system high-voltage lead can be seen in the upper right of FIG. 20. (It is the thick wire going to the top of the engine and terminates in a spark plug cap (partially seen).) The electric pre-heater and aluminum intake manifold are immediately behind the high-voltage lead. The electric pre-heater is an off-the-shelf Bosch glow plug designed for use in automotive diesel engines. The exhaust system and muffler exit from the right side of the cylinder head (as viewed from the back of the engine). The small tube is a pressure line to the fuel tank that pressurizes the fuel system. The carburetor itself is partially visible just above the tape in the rear of the engine. The long, thin protrusion from the carburetor is part of the air-fuel high-speed mixture adjustment needle. The heavy fuels engine may incorporate an electric preheater and spark ignition. The preheater may be in a different location (e.g., the air intake vs. the cylinder itself).

In one embodiment, the fuel for the engine maybe a mixture of JP-5 or JP-8 and lubricant in an 8:1 ratio (11% lubricant). The specific gravity is about 0.805. Lubricants include Yamalube 2-R and Honda GN-2 two-cycle engine lubricants. Too low a percentage of lubricant, or type, may negatively impact durability by increasing piston/cylinder and/or bearing wear. Conversely, too high a level may decrease maximum power, as well as potentially increasing combustion chamber deposits.

The engine may be considered a multifuel engine, running equally well on glow fuel, model diesel fuel, heavy fuels, and presumably also gasoline and automotive diesel fuels. The engine has the ability with its adjustable compression ratio to allow it to run on any of the fuels by modifying the compression ratio through the compression adjustment screw.

As alternatives to using ether as a starting aid, compression ratios can be increased and/or the fuel heated. As an example, suitable starting was provided by a combustion chamber volume of 0.20 cc and glow plug ignition.

In another embodiment, a modified head that incorporates an automotive diesel engine glow plug (Bosch P/N 80010) for combustion chamber pre-heating and a spark plug for ignition was provided. Use of a diesel glow plug in the combustion chamber provides a large source of heat in the presence of the compressed fuel-air mixture to directly vaporize the fuel, allowing it to be more easily ignited by the spark. The glow plug may heat the entire head to a temperature sufficient to vaporize the fuel and more easily ignite the fuel by the spark.

Embodiments of the invention include:
  Heavy-fuels engines based on several engine types, including compression-ignition and spark-ignition
  Various starting modalities including: electric pre-heating, ether assist, propane assist, alcohol assist, and MMO assist
  Ceramic hot-zone components in an engine running on both glow fuel and JP-5

Preferably, the engine is a small, spark-ignition heavy fuels engine. The operational characteristics with heavy fuels are currently better than compression ignition engines. Throttle transitions are smoother and the exhaust is visibly much cleaner. Compared to compression ignition engines the lower compression of spark-ignition systems also makes them a more attractive candidate for on-board starter/generators since engine weights are lighter than comparable compression ignition engines. Heavy fuels conversions of existing engines are easily accomplished with spark ignition.

With compression ignition conversions, new heads with higher compression ratios must be designed and fabricated, along with strengthening the crankcases. A range of existing spark ignition engines requiring minimal modifications can be converted to heavy fuels. Additionally, with spark ignition compression ratios can be maintained at or near base engine levels, resulting in much lower mechanical loads on the engine, yielding greater engine reliability and life.

Preferably, the engine includes ceramic engine components. High-wear components may benefit from the hardness and durability of ceramics with heavy fuels that have no added lubricants.

Auxiliary starting aids, such as electric preheating or ether, may be used with carbureted or port fuel injected heavy fuels engines, but may not be needed with direct cylinder fuel injection. The higher injection pressures of direct injection atomize the fuel so finely that additional starting aids may not be required. While electric pre-heating of the engine is effective, it may require several minutes or more to heat the engine to a point of starting. It also may increase the engine weight as well as requiring a battery of a size that makes it impractical as part of an airborne restart system. Starting aids such as propane, butane, ether, or alcohol are small and lightweight. There is no pre-heating required and they are able to start engines within 1 to 10 seconds depending on engine type and ambient conditions. Additionally, due to their light weight they can be incorporated into on-board starting systems for in-flight restarts.

FIG. 21 shows technical performance indices for heavy fuels engines according to embodiments of the invention.

Aspects of the invention may also be applied to non-aerial embodiments. For example, ground vehicles and water-based vehicles (including underwater vehicles, e.g., submarines) may utilize several of the concepts disclosed above.

As can be appreciated by one skilled in the art, a computer system with an associated computer-readable medium containing instructions for controlling the computer system can be utilized to implement the exemplary embodiments that are disclosed herein. The computer system may include at least one computer such as a microprocessor, microcontroller, digital signal processor, and associated peripheral electronic circuitry.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

We claim:

1. A method for a surveillance vehicle tracking a convoy, the convoy comprising at least one convoy vehicle, the method comprising:
   (a) obtaining a first location and velocity information of the surveillance vehicle;
   (b) obtaining a second location and velocity information of the convoy;
   (c) determining at least one path parameter corresponding to a first desired curvilinear path of the surveillance vehicle; and
   (d) determining a value of at least one control variable for the first desired curvilinear path, the at least one control variable comprising an altitude command for dynamically controlling an altitude of the surveillance vehicle.

2. The method of claim 1, wherein (a) comprises receiving the first location and velocity information of the surveillance vehicle, (b) comprises receiving the second location and velocity information of the convoy, and further comprising:
   (e) sending the value of the at least one control variable to the surveillance vehicle.

3. The method of claim 1, wherein (a) comprises receiving the first location and velocity information of the surveillance vehicle, and further comprising:
   (e) sending the value of the at least one control variable for the first desired curvilinear path to the surveillance vehicle.

4. The method of claim 3, wherein (b) comprises:
   (i) receiving global positioning system (GPS) information; and
   (ii) determining the second location and velocity information from the GPS information.

5. The method of claim 1, further comprising:
   (e) adjusting an actual path of the surveillance vehicle to approximate the first desired curvilinear path in accordance with the value of the at least one control variable.

6. The method of claim 1, further comprising:
   (e) causing a change from the first desired curvilinear path to another desired curvilinear path.

7. The method of claim 1, wherein the first desired curvilinear path comprises an approximately circular path, and wherein the at least one path parameter comprises a desired radial range ($P_d$) from the convoy.

8. The method of claim 1, wherein the convoy comprises a control vehicle, and wherein the method further comprises:
   (e) instructing the surveillance vehicle, by the control vehicle, to travel in the first desired curvilinear path.

9. The method of claim 8, wherein (e) comprises:
   (i) sending a command to the surveillance vehicle, the command containing the value of the at least one control variable.

10. The method of claim 1, wherein the at least one control variable comprises a roll angle command.

11. A computer-readable medium having computer-executable instructions for performing the method as recited in claim 1.

12. A method for a surveillance vehicle tracking a convoy, the convoy comprising at least one convoy vehicle, the method comprising:
   (a) obtaining a first location and velocity information of the surveillance vehicle;
   (b) obtaining a second location and velocity information of the convoy;
   (c) determining at least one path parameter corresponding to a first desired curvilinear path of the surveillance vehicle; and
   (d) determining a value of at least one control variable for the first desired curvilinear path, the at least one control variable including an altitude command and a roll angle command, further comprising:
   (i) determining a roll angle by:

$$\Phi^- = a\tan\{V_a \cdot V_r/(g\|P_r\|)\},$$

wherein $V_a$ is an aircraft true velocity, $V_r$ is a relative velocity, and $P_r$ is a relative position.

13. The method of claim 12, wherein (d) further comprises:
   (ii) determining the roll angle by:

$$\Phi^{-*} = \Phi^- + (\pi/2 - a\cos\{V_a \cdot P_r/(\|V_a\|\|P_r\|)\}).$$

14. The method of claim 13, wherein (d) further comprises:
   (iii) determining the roll angle by:

$$\Phi^{-**} = \Phi^{-*} - \Psi,$$

wherein Ψ is determined by:
(1) $\Psi = a\sin\{V_{rad\_err}/\|V_r\|\}$, if $|V_{rad\_err}| < \|V_r\|\sin(\max\_\text{angle})$; and
(2) $\Psi = a\sin\{V_{rad\_err}/\|V_r\|\}$, otherwise.

15. The method of claim 11, wherein (d) comprises:
(ii) determining an altitude by:

$$A = \|P_r\|\tan(\Phi^- + \text{cam}),$$

wherein cam corresponds to a mounting angle of a camera.

16. An apparatus for controlling a satellite vehicle, comprising:
  a communications interface that communicates with the satellite vehicle over a wireless communications channel;
  a global positioning system (GPS) receiver for receiving GPS information; and
  a processor that obtains a first position and first velocity information from the communications interface, wherein the first position and first velocity information are associated with the satellite vehicle, and that determines a second position and second velocity information from the GPS information, wherein the second position and second velocity information correspond to the apparatus, the processor configured to perform the steps of:
  (a) receiving the first location and first velocity information of the satellite vehicle;
  (b) obtaining the second location and second velocity information of the apparatus;
  (c) determining at least one path parameter corresponding to a desired curvilinear path of the satellite vehicle; and
  (d) determining a value of at least one control variable for the desired curvilinear path, the at least one control variable comprising an altitude command for dynamically controlling an altitude of the satellite vehicle; and
  (e) sending the value of the at least one control variable for the desired curvilinear path to the satellite vehicle.

17. An apparatus for controlling a satellite vehicle, comprising:
  a communications interface that communicates with the satellite vehicle over a wireless communications channel;
  a global positioning system (GPS) receiver for receiving GPS information; and
  a processor that obtains a first position and first velocity information from the communications interface, wherein the first position and first velocity information are associated with the satellite vehicle, and that determines a second position and second velocity information from the GPS information, wherein the second position and second velocity information correspond to the apparatus, the processor configured to perform the steps of:
  (a) receiving the first location and first velocity information of the satellite vehicle;
  (b) obtaining the second location and second velocity information of the apparatus;
  (c) determining at least one path parameter corresponding to a desired curvilinear path of the satellite vehicle; and
  (d) determining a value of at least one control variable for the desired curvilinear path, wherein the at least one control variable comprises a roll angle;
  (e) sending the value of the at least one control variable for the desired curvilinear path to the satellite vehicle; and
  (f) determining the roll angle by:

$$\Phi^- = a\tan\{V_a \cdot N_r / (g\|P_r\|)\},$$

wherein $V_a$ is an aircraft true velocity, $V_r$ is a relative velocity, and $P_r$ is a relative position.

18. The apparatus of claim 17, wherein the processor is further configured to perform:
  (g) determining the roll angle by:

$$\Phi^{-*} = \Phi^- + (\pi/2 - a\cos\{V_a \cdot P_r / (\|V_a\|\|P_r\|)\}).$$

19. The apparatus of claim 18, wherein the processor is further configured to perform:
  (h) determining the roll angle by:

$$\Phi^{-**} = \Phi^{-*} - \Psi,$$

wherein Ψ is determined by:
(1) $\Psi = a\sin\{V_{rad\_err}/\|V_r\|\}$, if $|V_{rad\_err}| < \|V_r\|\sin(\max\_\text{angle})$; and
(2) $\Psi = a\sin\{V_{rad\_err}/\|V_r\|\}$, otherwise.

20. The apparatus of claim of 17, wherein the at least one control variable comprises an altitude and wherein the processor is further configured to perform:
  (g) determining the altitude by:

$$A = \|P_r\|\tan(\Phi^- + \text{cam}),$$

wherein cam corresponds to a mounting angle of a camera.

21. An apparatus for providing surveillance for a convoy vehicle, comprising:
  a communications interface that communicates with the convoy vehicle over a wireless communications channel;
  a propulsion system that propels the apparatus;
  a guidance system that guides the propulsion system; and
  a processor that obtains position and velocity information, that transmits the position and velocity information through the communications channel, that receives a value of at least one control variable from the communications interface, and that provides the value of the at least one control variable to the guidance system in order to maintain a desired curvilinear path of the apparatus, the at least one control variable comprising an altitude command for dynamically controlling an altitude of a surveillance vehicle.

* * * * *